US012228270B2

(12) United States Patent
Hierzer

(10) Patent No.: US 12,228,270 B2
(45) Date of Patent: Feb. 18, 2025

(54) LIGHTING DEVICE

(71) Applicant: H4X e.U., Graz (AT)

(72) Inventor: Andreas Hierzer, Graz (AT)

(73) Assignee: H4X E.U., Graz (AT)

(*) Notice: Subject to any disclaimer, the term of this patent is extended or adjusted under 35 U.S.C. 154(b) by 0 days.

(21) Appl. No.: 17/984,609

(22) Filed: Nov. 10, 2022

(65) Prior Publication Data

US 2023/0146822 A1 May 11, 2023

(30) Foreign Application Priority Data

Nov. 10, 2021 (DE) ........................ 102021212672.3

(51) Int. Cl.
*F21V 21/096* (2006.01)
*F21S 8/02* (2006.01)
(Continued)

(52) U.S. Cl.
CPC ............. *F21V 21/096* (2013.01); *F21S 8/02* (2013.01); *F21S 8/026* (2013.01); *F21S 8/028* (2013.01);
(Continued)

(58) Field of Classification Search
CPC ... F21S 8/02; F21S 8/026; F21S 8/028; F21V 21/002; F21V 21/005; F21V 21/04;
(Continued)

(56) References Cited

U.S. PATENT DOCUMENTS 2,597,595 A 5/1952 Ordas
2,695,950 A * 11/1954 Zingone .................. F21V 21/08 248/309.4

(Continued)

FOREIGN PATENT DOCUMENTS

CN 202546421 U * 11/2012
CN 203893076 U * 10/2014 ............. F21S 8/026

(Continued)

OTHER PUBLICATIONS

Machine translation of DE 19924036 A1 retrieved from the FIT database of PE2E search. (Year: 2023).*

(Continued)

*Primary Examiner* — Colin J Cattanach
(74) *Attorney, Agent, or Firm* — Millen, White, Zelano & Branigan P.C.; William F. Nixon

(57) ABSTRACT

The invention relates to a lighting device (1; 1'; 1"; 101; 101') with a lamp housing (2; 2'; 2"; 102; 102') and a lighting unit (3; 3'; 3"; 103; 103'). The lamp housing has a light emission area (7; 7'; 7"; 107; 107') on a light output side (5; 5'; 5"; 105; 105') thereof and on a side (11; 11') facing away from the light output side (11; 11'; 11"; 111; 111') thereof has a curved, dome-shaped rear wall (13; 13'; 13"; 113; 113'). The lighting unit is set up to emit light on the light output side (17; 17'; 17"; 117; 117') thereof in order to emit the light through the light emission area of the lamp housing. The lighting unit has at least one device (23; 23'; 23") on a rear side (19; 19'; 19"; 119; 119') facing away from the light output side (17; 17'; 17"; 117; 117'); 123; 123') which can be used to attach the lighting unit in a selectable location on the rear wall (13; 13'; 13"; 113; 113') of the lamp housing using a magnetic force, thereby enabling adjustment of the beam direction (A) of the lighting unit in relation to the lamp housing.

20 Claims, 10 Drawing Sheets

Figure 1:
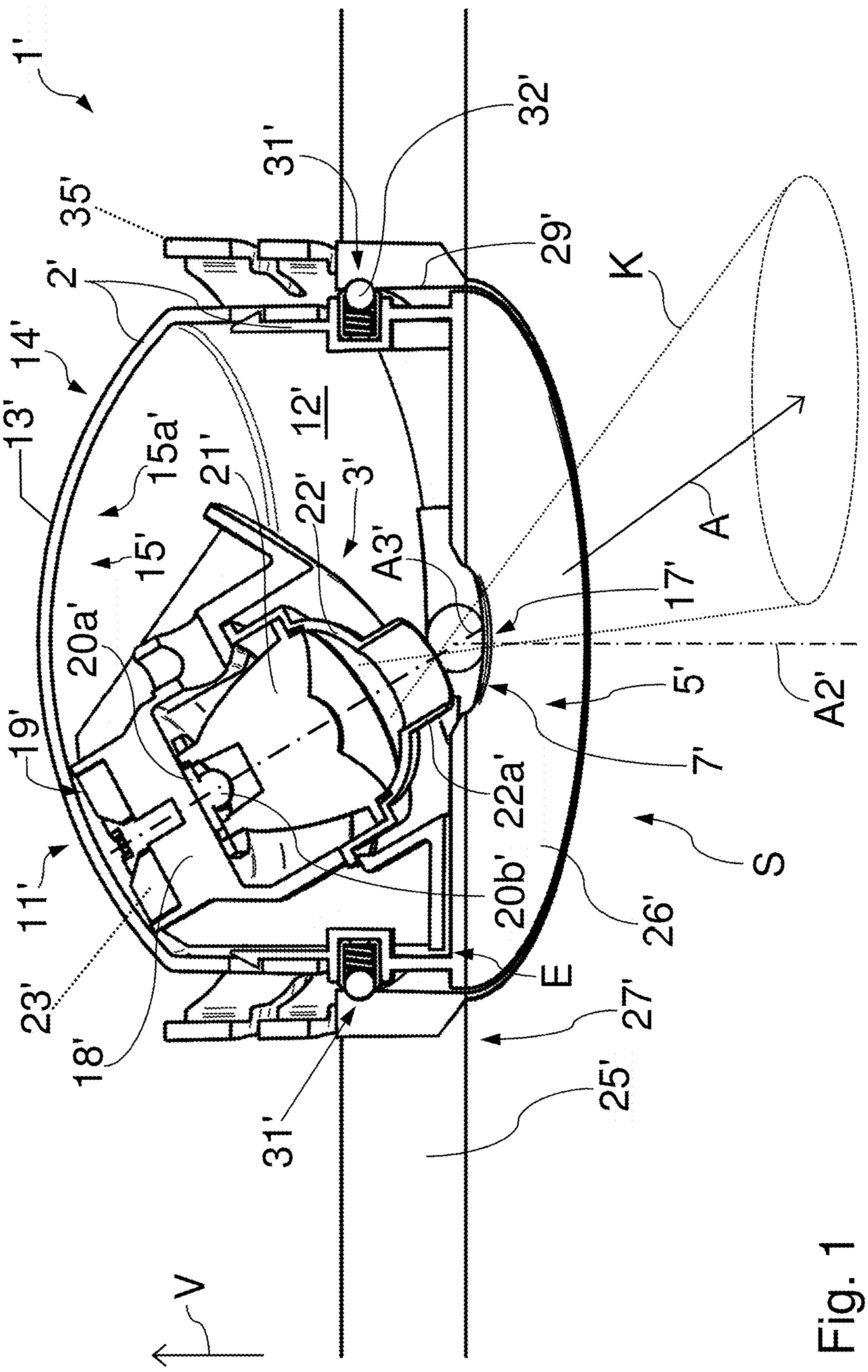

(51) Int. Cl.

| | |
|---|---|
| ***F21V 14/02*** | (2006.01) |
| ***F21V 21/002*** | (2006.01) |
| ***F21V 21/005*** | (2006.01) |
| ***F21V 21/04*** | (2006.01) |
| ***F21W 131/20*** | (2006.01) |
| ***F21W 131/202*** | (2006.01) |
| ***F21W 131/205*** | (2006.01) |
| ***F21W 131/208*** | (2006.01) |

(52) U.S. Cl.

CPC ............. *F21V 14/02* (2013.01); *F21V 21/002* (2013.01); *F21V 21/005* (2013.01); *F21V 21/04* (2013.01); *F21V 21/041* (2013.01); *F21V 21/042* (2013.01); *F21V 21/043* (2013.01); *F21V 21/044* (2013.01); *F21V 21/045* (2013.01); *F21V 21/046* (2013.01); *F21V 21/047* (2013.01); *F21V 21/048* (2013.01); *F21V 21/049* (2013.01); *F21V 21/0965* (2013.01); *F21W 2131/20* (2013.01); *F21W 2131/202* (2013.01); *F21W 2131/205* (2013.01); *F21W 2131/208* (2013.01)

(58) Field of Classification Search

CPC .... F21V 21/041; F21V 21/042; F21V 21/043; F21V 21/044; F21V 21/045; F21V 21/046; F21V 21/047; F21V 21/048; F21V 21/049; F21V 21/096; F21V 14/02; F21W 2131/20; F21W 2131/202; F21W 2131/205; F21W 2131/208

See application file for complete search history.

(56) References Cited

U.S. PATENT DOCUMENTS

| | | | | |
|---|---|---|---|---|
| 2013/0044501 | A1* | 2/2013 | Rudisill | F21V 29/70 362/398 |
| 2014/0268733 | A1 | 9/2014 | Holland et al. | |
| 2016/0327222 | A1* | 11/2016 | Rudisill | F21V 23/06 |
| 2017/0184285 | A1* | 6/2017 | Visser | F21V 23/008 |
| 2018/0100634 | A1* | 4/2018 | Hierzer | F21V 21/096 |
| 2022/0299176 | A1* | 9/2022 | Jones | F21V 21/30 |
| 2023/0045452 | A1* | 2/2023 | Portinga | F21V 29/76 |

FOREIGN PATENT DOCUMENTS

| | | | | | |
|---|---|---|---|---|---|
| CN | 113551167 | B | | 2/2022 | |
| DE | 19924036 | A1 | * | 11/2000 | F21S 8/02 |
| GB | 2239307 | A | * | 6/1991 | F21S 8/02 |
| JP | 2007026720 | A | * | 2/2007 | F21V 21/096 |
| KR | 20120036553 | A | * | 4/2012 | F21V 21/045 |
| KR | 20180010851 | A | * | 1/2018 | F21V 17/16 |
| WO | WO-2011036610 | A1 | * | 3/2011 | F21S 6/002 |

OTHER PUBLICATIONS

Machine translation of CN 203893076 U retrieved from the FIT database of PE2E search. (Year: 2023).*

Machine translation of KR 20120036553 A retrieved from the FIT database of PE2E search. (Year: 2023).*

Machine translation of KR 20180010851 A retrieved from the FIT database of PE2E search. (Year: 2023).*

Machine translation of JP 2007026720 A retrieved from the FIT database of PE2E search. (Year: 2023).*

Machine translation of CN 202546421 U retrieved from the FIT database of PE2E search. (Year: 2023).*

Office Action in corresponding DE 102021212672.3 dated May 17, 2022 (pp. 1-10).

Search report in corresponding EP application 22206694 dated Apr. 5, 2023 (pp. 1-2).

Office Action in corresponding AT application 50914/2021 dated Nov. 15, 2023 (pp. 1-3).

* cited by examiner

LIGHTING DEVICE

FIELD OF THE INVENTION

The invention relates to a lighting device.

TECHNICAL BACKGROUND

The invention can be useful in many application and/or assembly situations in the field of indoor lighting, for example, but also as outdoor lighting. In the following, we begin by explaining the invention and the underlying problem using the example of a built-in light.

Recessed lights, for example downlights emitting light from the ceiling, in particular into a room, are already commonly used in a wide variety of designs. Lighting devices which use magnetic forces for fastening or holding purposes have also already been proposed.

DE 10 2015 226 625 A1, for example, describes a lighting system with favourable anti-glare properties which offers the user a high degree of flexibility, wherein it is proposed that a light supply device could be attached inside a housing at different locations to the inner surface area of the housing using magnetic adhesion. This allows the light supply device to be positioned very freely within the housing.

A lighting device of this type involving the magnetic fastening of a light-generating unit means that the lighting direction can be adjusted in a very flexible yet discrete way. However, the adjusting procedure to position the lighting direction often includes at least two separate movements, namely the mechanical displacement of the light-generating unit, followed by the mechanical adjustment of the angular alignment in proportion to the changed position of the light-generating unit in relation to the exit opening. The adjustment of the light source is therefore very flexible yet at the same time relatively complex.

It would often be desirable to have a simpler setting option, wherein this should preferably also involve inconspicuous accommodation and/or protection of the light-generating unit.

SUMMARY OF THE INVENTION

Against this background, the invention is based on the object of creating a lighting device that enables the lighting direction to be adjusted more easily and quickly.

According to the invention, this object is achieved by a lighting device with the features of Patent Claim 1.

A lighting device with a lamp housing and a lighting unit is proposed. In this case, the lamp housing is designed with a light emission area on the light output side thereof, and the lamp housing is furthermore designed with a curved, dome-shaped rear wall on a side thereof facing away from the light output side. In this case, the lighting unit is set up to emit light on the light output side thereof in order to emit the light through the light emission area of the lamp housing. Furthermore, the lighting unit has at least one device on the rear side of the lighting unit facing away from the light output side, which can be used to attach the lighting unit to a selectable point on the rear wall of the lamp housing using a magnetic force and thereby adjust the beam direction from the lighting unit in relation to the lamp housing.

The present invention is based on the finding that if the lighting unit is magnetically fastened to a curved, dome-shaped rear wall at a selectable point, it is possible to accommodate the lighting unit in the lamp housing with a simple structure, which, for example, can be used to create particularly discreet, hidden lighting and/or to protect the lighting unit, while at the same time using the dome-like curvature of the rear wall to align the lighting unit and thereby adjust or set the beam direction. Complicated mechanical mechanisms are not required. The rear wall can be used in a compact way for attachment and at the same time as a rear housing closure. The lighting unit can be fastened quickly and with little effort. The fully assembled lighting unit can be very easily connected to the lamp housing to form a functional light.

Favourable embodiments and developments of the invention are described in the additional dependent claims and the description with reference to the figures.

In a preferred embodiment, at least one device is attached to the rear side of the lighting unit and is designed as at least one magnet, in particular as at least one permanent magnet. An effective magnetic force effect can thereby be achieved in a simple, compact manner with little effort.

In particular, the beam direction of the lighting unit can be adjusted by moving the rear side of the lighting unit along the curved, dome-like rear wall of the lamp housing. For example, the achievable adjustment can be influenced by the curved shape design. Moving the rear side of the lighting unit along the rear wall allows for a variety of adjustment options.

According to one development, the adjustability of the beam direction includes adjustability of the beam angle of the lighting unit in relation to an axis of the lamp housing and/or adjustability by rotating the beam direction around the axis of the lamp housing. In this way, the beam direction can be adjusted in many different ways. The lighting device therefore offers great flexibility with regard to the achievable lighting direction.

In one embodiment, the curved, dome-shaped rear wall has an internal surface which is formed as part of a spherical surface. In particular, in further embodiments, the outer surface of the curved, dome-shaped rear wall can additionally be formed with part of a spherical surface. For example, in one embodiment, the curved, dome-shaped rear wall can also have a substantially uniform wall thickness. The selection of a spherical surface, in particular for the internal surface of the rear wall, contributes to a uniform adjustability of the beam direction when the lighting unit is moved along the rear wall, due to its constant curvature. For example, the rear wall can be designed as a spherical cap.

In particular, in one embodiment, the lighting unit is largely or completely positioned within the interior of the lamp housing. Accommodating the lighting unit in this way makes it possible to hide it in an aesthetic and unobtrusive way, in other words to accommodate it in such a way that it is not very visible to the viewer and does not attract attention. Furthermore, accommodating the lighting unit in this way facilitates good protection of the unit if required, for example when used outdoors to protect it from moisture and/or dirt.

In one embodiment, the lighting device is designed as a built-in lamp and/or the lamp housing is designed to be mounted in a recess or a cavity, in particular a recess or cavity in a ceiling or a ceiling component, a wall or a wall component, a floor or floor component or in an outer housing. This adds to the benefits of recessed and/or protected accommodation of the lighting unit.

In an development, the lamp housing is designed to essentially lie flush with a surface surrounding the mounted lamp housing when in an assembled state. Such accommodation of the lamp housing can, for example, have a restrained and aesthetic effect. The surface surrounding the mounted lamp housing could, for example, be the surface of a plate element, such as a false ceiling, wall or floor panel, or a surface around another type of recess in a ceiling, floor, wall or other element.

According to one embodiment, the lamp housing has one or more ball plungers to fasten the lamp housing. These can be used for the simplified, preferably detachable, attachment of the lamp housing at the installation site.

In a further embodiment, the lamp housing has one or more fastening devices for attaching the lamp housing in the recess of a plate element. This further simplifies the structure of the lighting device. The fastening devices can, for example, each have a tab element which is intended to engage behind the plate element near the edge of the recess.

In one embodiment, the beam direction of the lighting unit can be adjusted using a tool provided for this purpose. This makes it possible to use smaller versions of those elements of the lighting unit provided for the adjustment which are accessible to the operator for this purpose, and to completely avoid direct mechanical access by touching the elements, for example to improve the protective effect of the housing.

In one development, the tool is rod-shaped or tubular. This can make it easier, for example, to exert a suitable force on the lighting unit in order to adjust it.

In a further development, the tool has a continuous opening which allows light emitted by the lighting unit to exit through the continuous opening when adjusting the beam direction using the tool, which makes it possible for the operator to see the current beam direction of the lighting unit.

In one embodiment, the light emission area of the lamp housing is designed with a light emission opening accessible from a visible side when the lighting device is in the installed state. In particular, the tool is designed to temporarily engage, in particular within the coupling device, with a coupling device on the light output side of the lighting unit in order to adjust the beam direction, in particular with access via the light emission opening of the lamp housing. A reliable adjustment of the beam direction can thus be achieved from the visible side.

In one embodiment, the rear wall of the lamp housing is made from a ferromagnetic material, in particular steel. The lighting unit can thereby be easily, efficiently and conveniently attached using the magnetic force.

In a further development, the lamp housing has at least one access opening in a section thereof between the light output side and the curved, dome-shaped rear wall. In particular, the access opening is located in a lateral wall of the lamp housing. In particular, a wire for the electrical supply of the lighting unit, for example a cable, can be routed through the access opening, wherein the line connects the lighting unit to a control device located outside of the lamp housing. The lighting unit can thus be supplied with electrical energy for its operation in a simple manner and the lighting unit can be adjusted without hindrance.

In one embodiment, the lamp housing has a cover element which is formed with the light emission area and is positioned to cover an opening in the lamp housing on the light output side and which enables the lighting unit to be inserted into the lamp housing through the opening, wherein the cover element for covering the opening is magnetically attachable. This enables the lighting unit to be easily inserted and the cover element to be attached in a simple and reliable manner.

In one embodiment, the lighting device is intended for use indoors, in particular for installation in an interior area of a building.

In another embodiment, the lighting device is designed for outdoor use.

According to one embodiment, when the lighting device is in an operational state, the lighting unit is positioned completely within an internal space of the lamp housing, wherein the interior space is closed off from the outside and preferably sealed to prevent the ingress of water and/or dust from the outside. Such a lighting device is favourable for use outdoors, for example, where dirt and/or moisture are to be expected.

In a further development, the tool is designed with a counter-magnet which can be positioned on the external side of the curved, dome-shaped rear wall of the lamp housing and can preferably be moved on the outside. In this case, the counter-magnet attracts and interacts with the device on the rear side of the lighting unit, in particular with its magnet. This allows for easy adjustment of the beam direction while at the same time keeping the internal space of the lamp housing tightly sealed. When the counter-magnet is moved, this results in a corresponding movement on the rear side of the lighting unit in the internal space of the lamp housing.

In a further development, the rear wall of the lamp housing is made of a non-ferro-magnetic material, in particular a plastic or aluminium or an aluminium alloy. This can be favourable in order to achieve effective magnetic interaction between the device on the rear side of the lighting unit and the tool used for adjustment on the other side of the rear wall.

According to a further embodiment, the light emission area of the lamp housing has a light-transmitting cover that closes the lamp housing on the light output side. This achieves a protective effect with the simultaneous emission of light.

In yet another embodiment, a wire for an electrical supply to the lighting unit is led out from the internal space of the lamp housing through a sealed channel. This makes it possible to supply the lighting unit without impairing the sealing of the internal space, for example to protect it from moisture and/or dust.

An development proposes that the beam direction can be continuously adjusted or that the beam direction can be adjusted in predefined steps. In particular, it suggests that the beam angle can either be adjusted continuously or in predefined steps in relation to the axis of the lamp housing and/or the beam direction can be adjusted through continuous rotation around the axis of the lamp housing. Predefined steps can facilitate the precise adjustment of the beam direction, for example if the beam needs to be set at an identical angle to other lighting devices of the same type, for example with regard to the inclination relative to the housing axis. Continuous movement, on the other hand, increases flexibility when making adjustments.

In one embodiment, an element, in particular a ball, is attached to the rear side of the lighting unit and is spring-loaded towards the curved, dome-shaped rear wall in the internal side of the lamp housing. This type of element can create a latching effect due to the spring loading which can, for example, make it easier to adjust the beam gradually. A ball, for example, enables a simple transition from one step to the next and/or can simplify, for example, the continuous rotation of the beam direction around the axis of the lamp housing.

In a further embodiment, the curved, dome-shaped rear wall of the lamp housing in particular features concentric grooves on the internal side of the housing. For example, the spring-loaded element at the rear side of the lighting unit can engage with one of the selectable grooves, in particular in a latching and detachable manner, in order to implement predefined levels of the beam angle in relation to the axis of the lamp housing. In such an embodiment, the grooves enable the continuous rotation of the beam direction around the axis of the lamp housing.

In a further development, the lighting unit initially widens and then narrows in a longitudinal section of the unit from the light output side to the rear side of the lighting unit, wherein the area with the maximum radial dimension of the lighting unit is closer to the light output side than to the rear, or the lighting unit has a middle area with substantially constant maximum radial dimension aligned between the light output side and the back of the lighting unit. In this way, the lighting unit can be provided with a sufficiently large heat sink for effective heat dissipation while at the same time allowing for the adjustment of the lighting unit within a satisfactory angular range.

In particular, in one embodiment, the beam direction of the lighting unit can be inclined by an angle of up to approximately 30 degrees in relation to the axis of the lamp housing. However, other maximum tilt angles of inclination between the beam direction and the axis of the lamp housing are conceivable.

The embodiments and developments described above can be combined in any way where appropriate. Further possible embodiments, developments and implementations of the invention also include combinations of features of the invention described above or below with regard to the exemplary embodiments not explicitly mentioned. In particular, the person skilled in the art will also add individual aspects to the respective basic form of this invention as improvements or additions.

CONTENTS OF THE DRAWING

Figure 2:
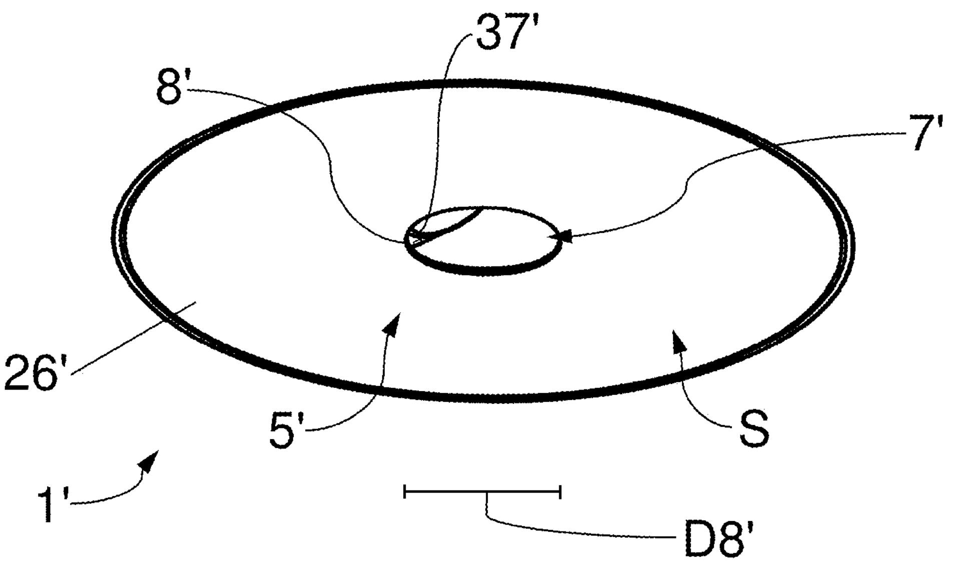
Figure 3:
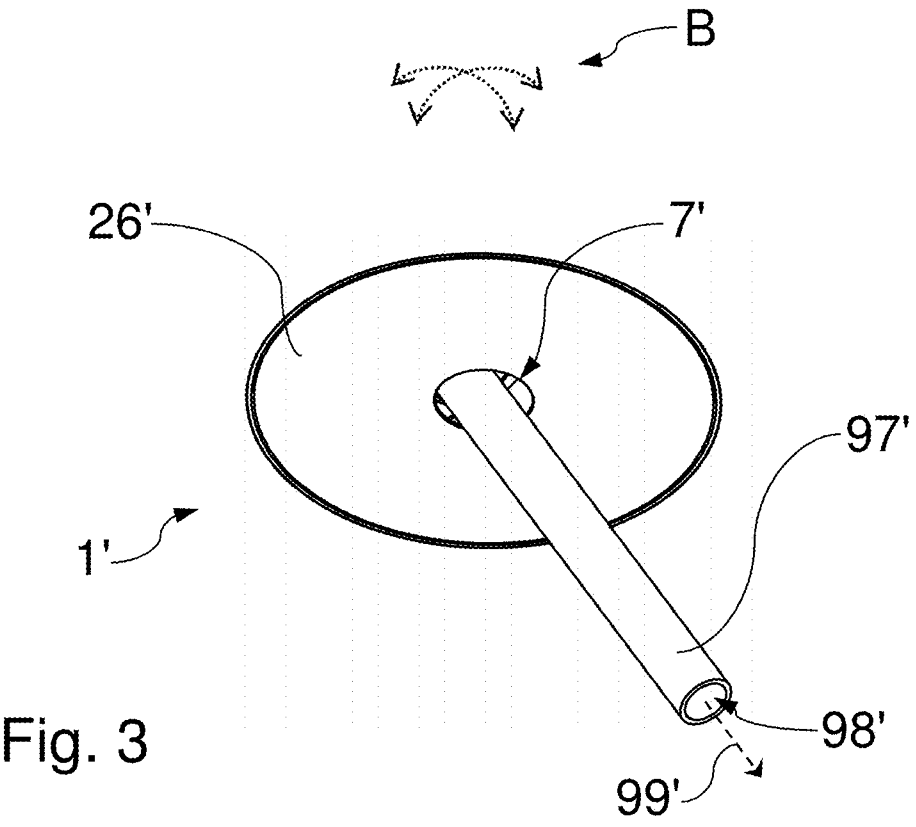
Figure 4:
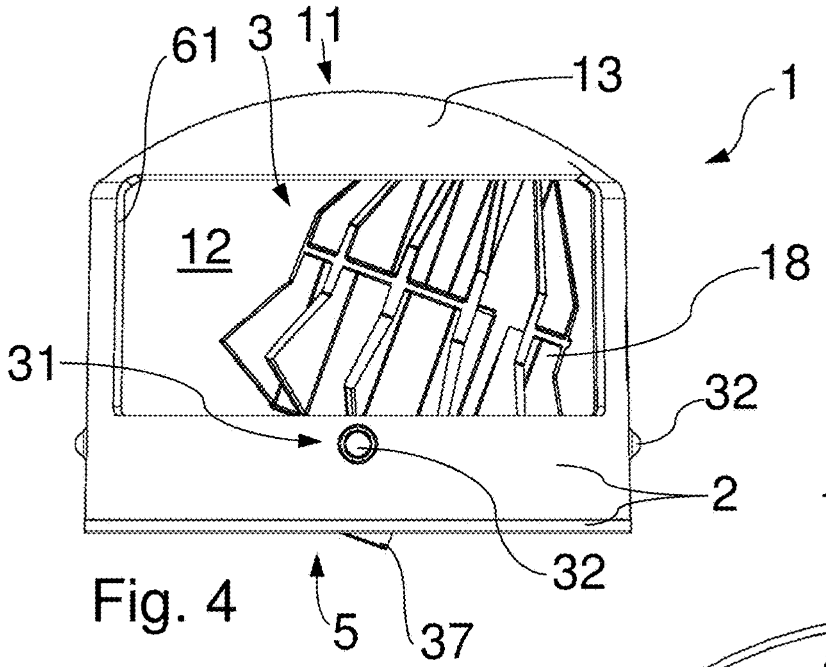
Figure 6:
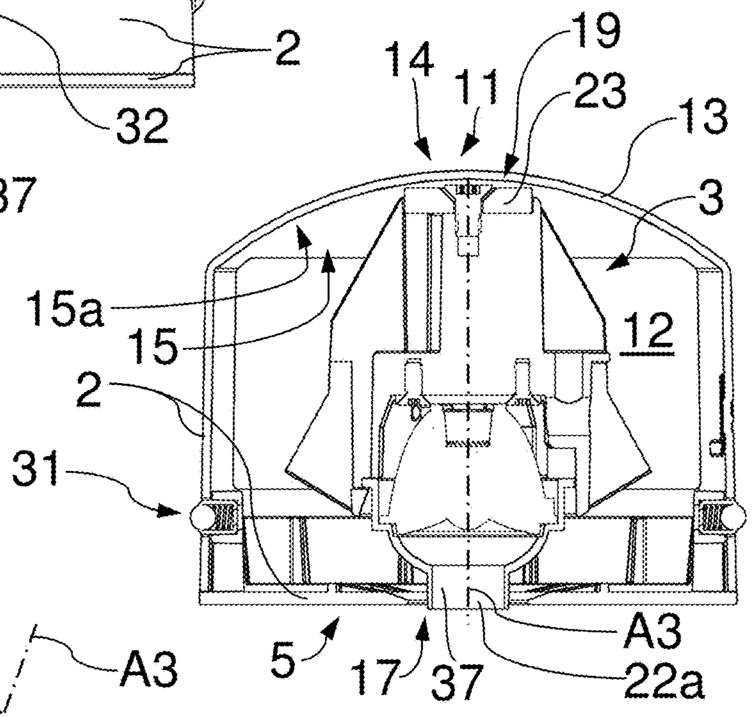
Figure 5:
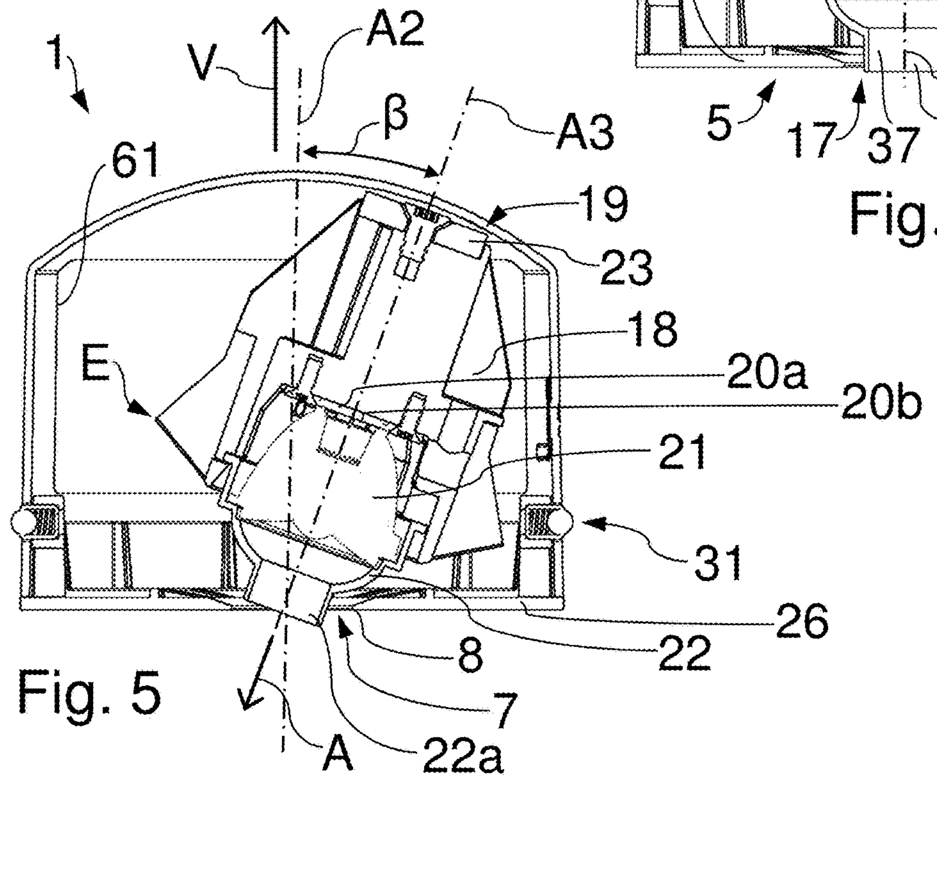
Figure 7:
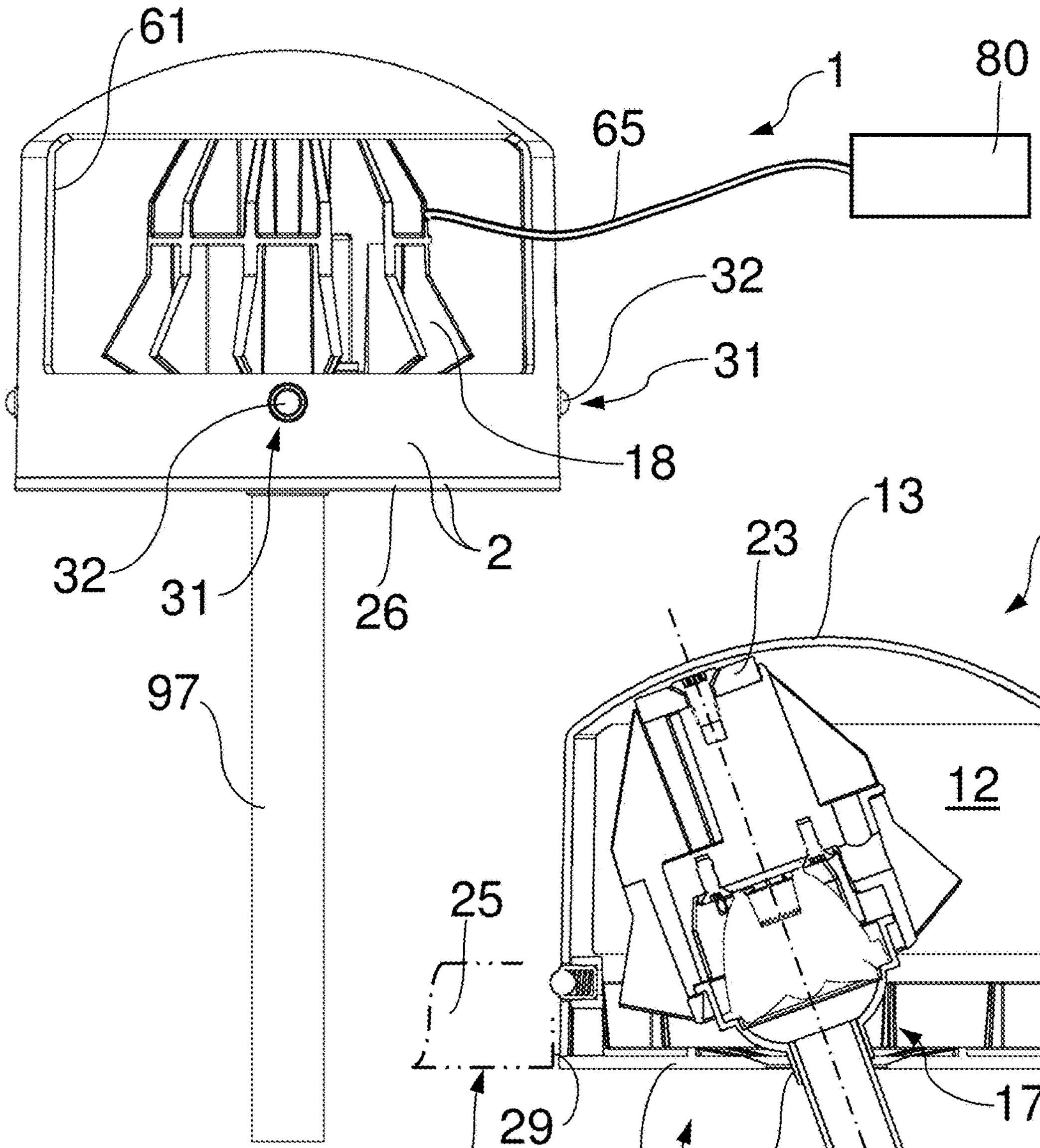
Figure 8:
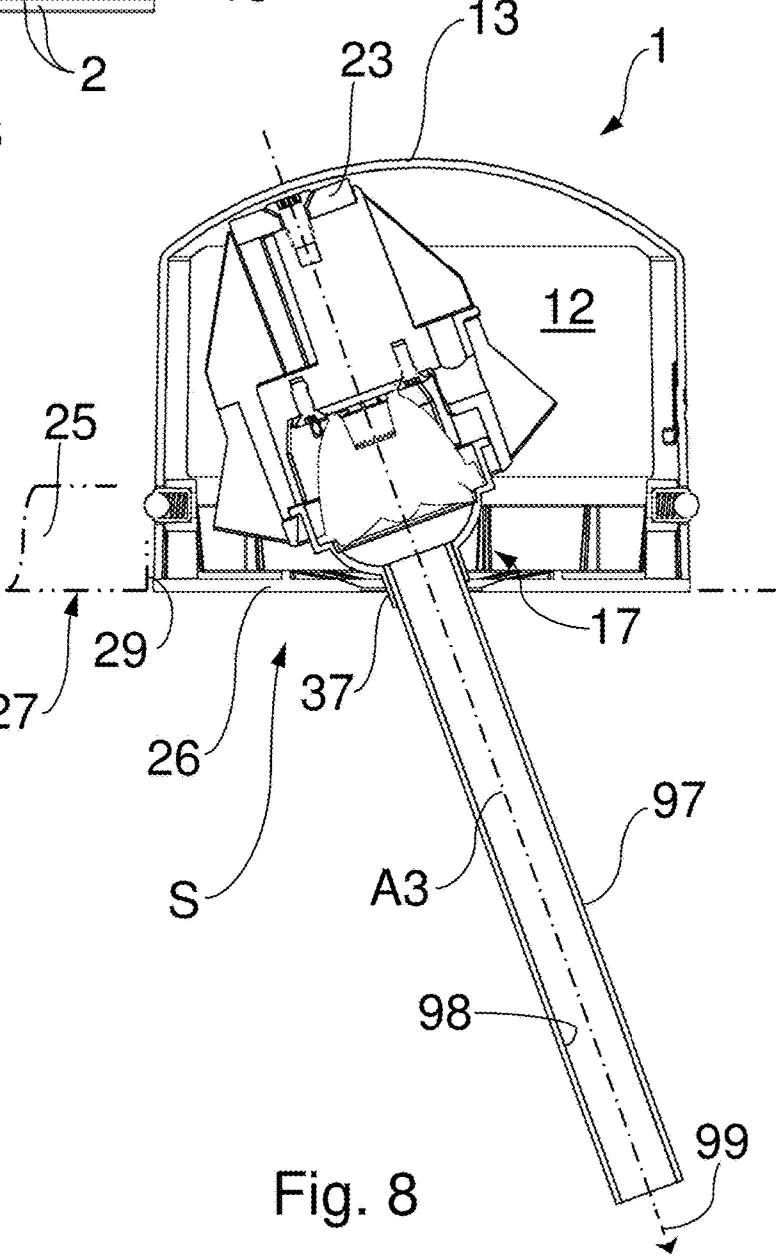
Figure 9:
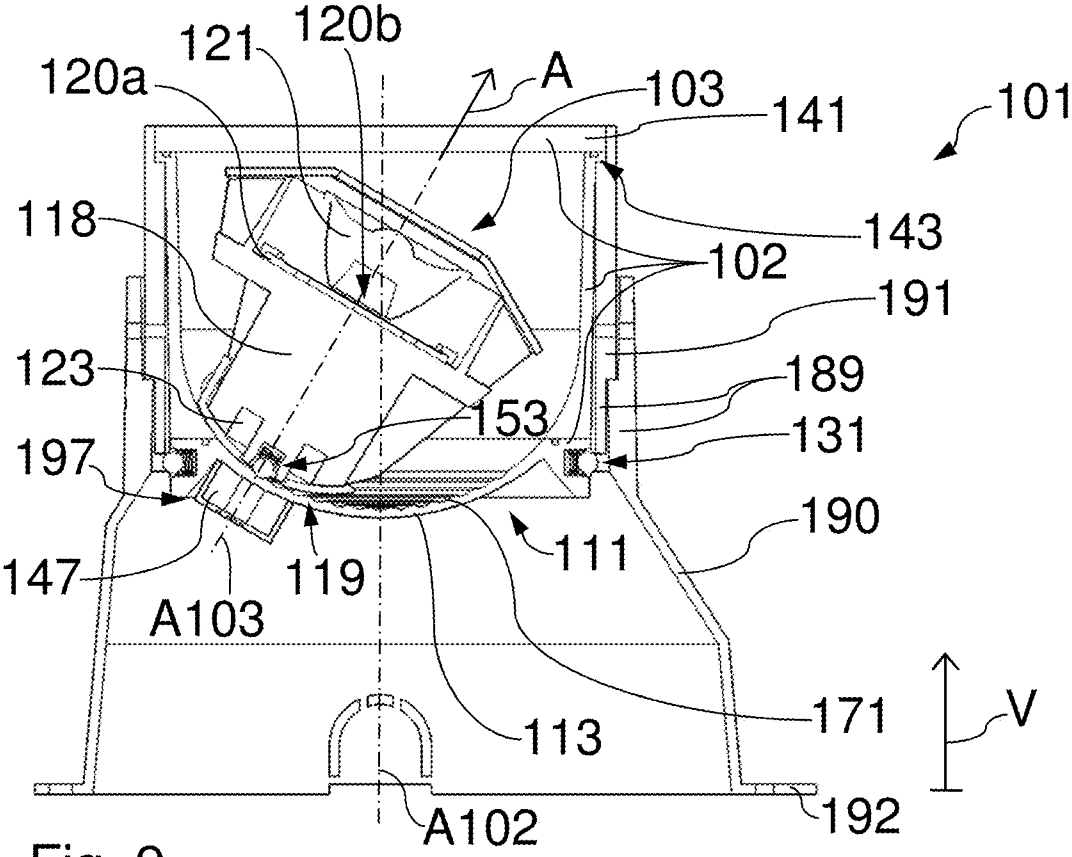
Figure 10:
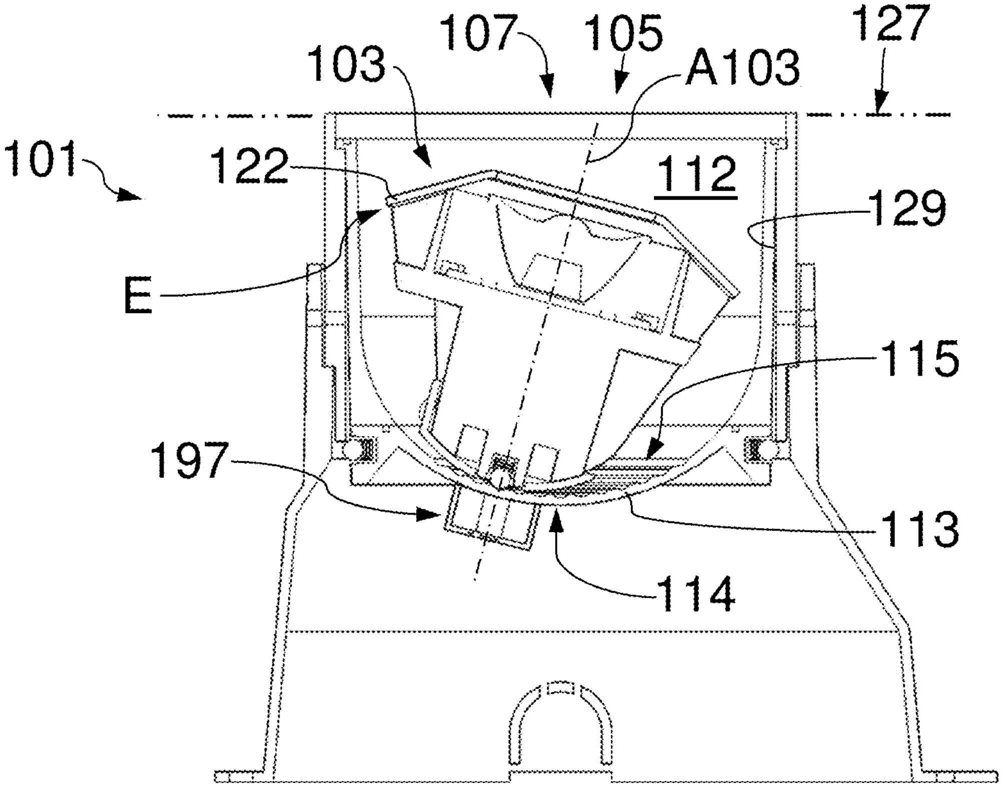
Figure 11:
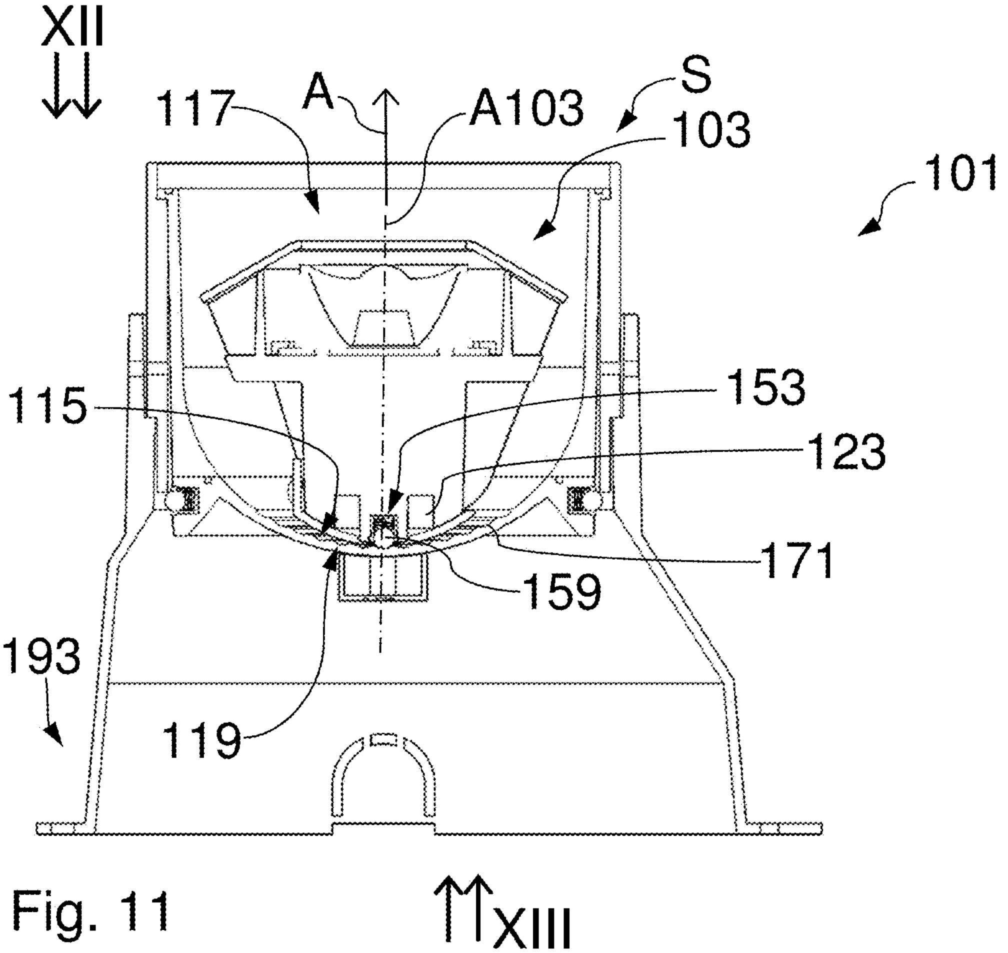
Figure 12:
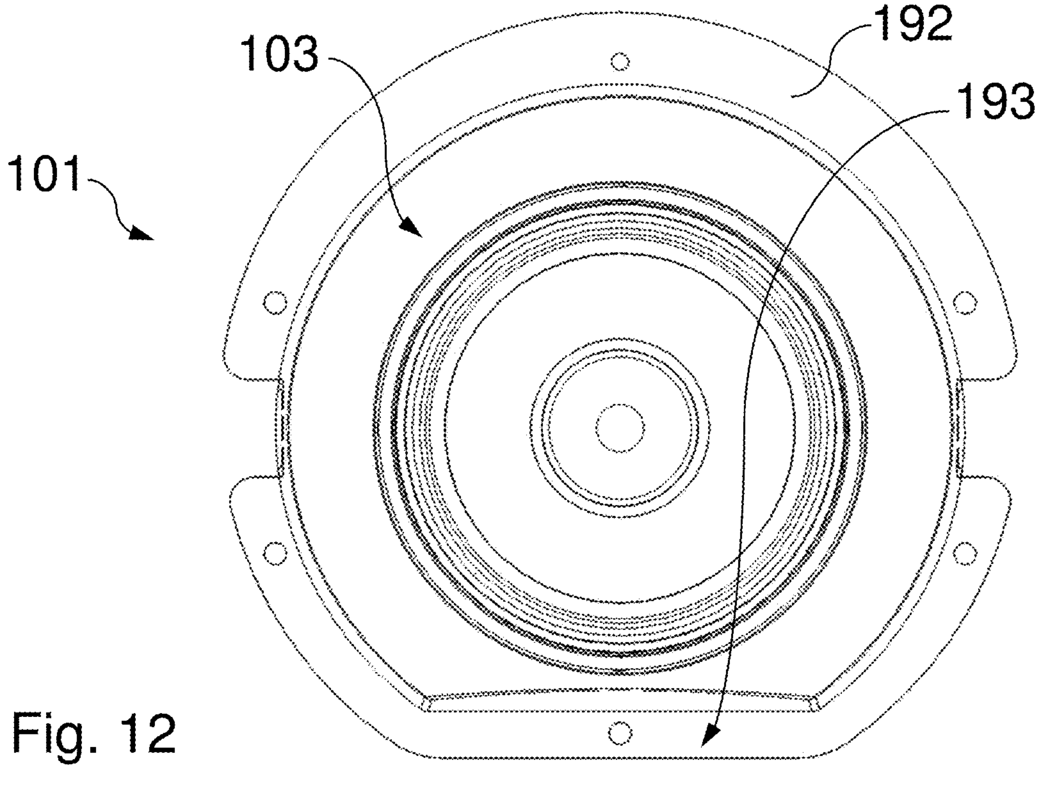
Figure 13:
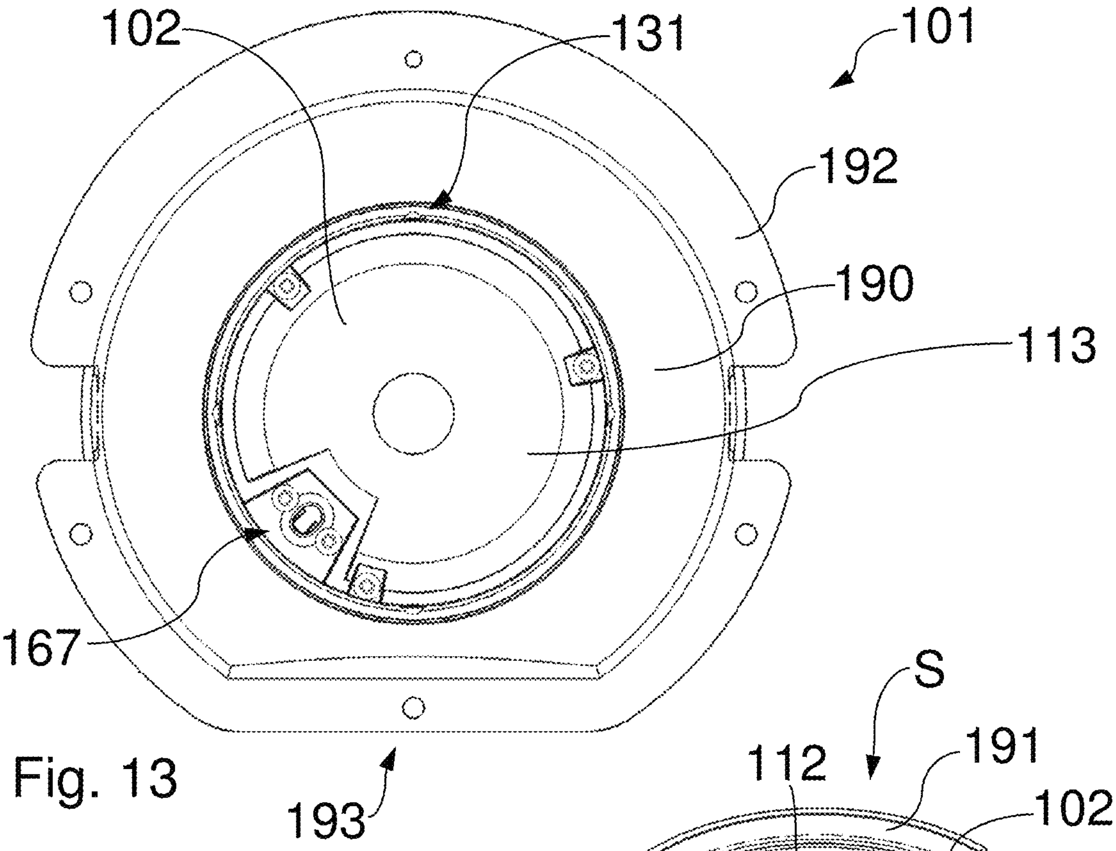
Figure 14:
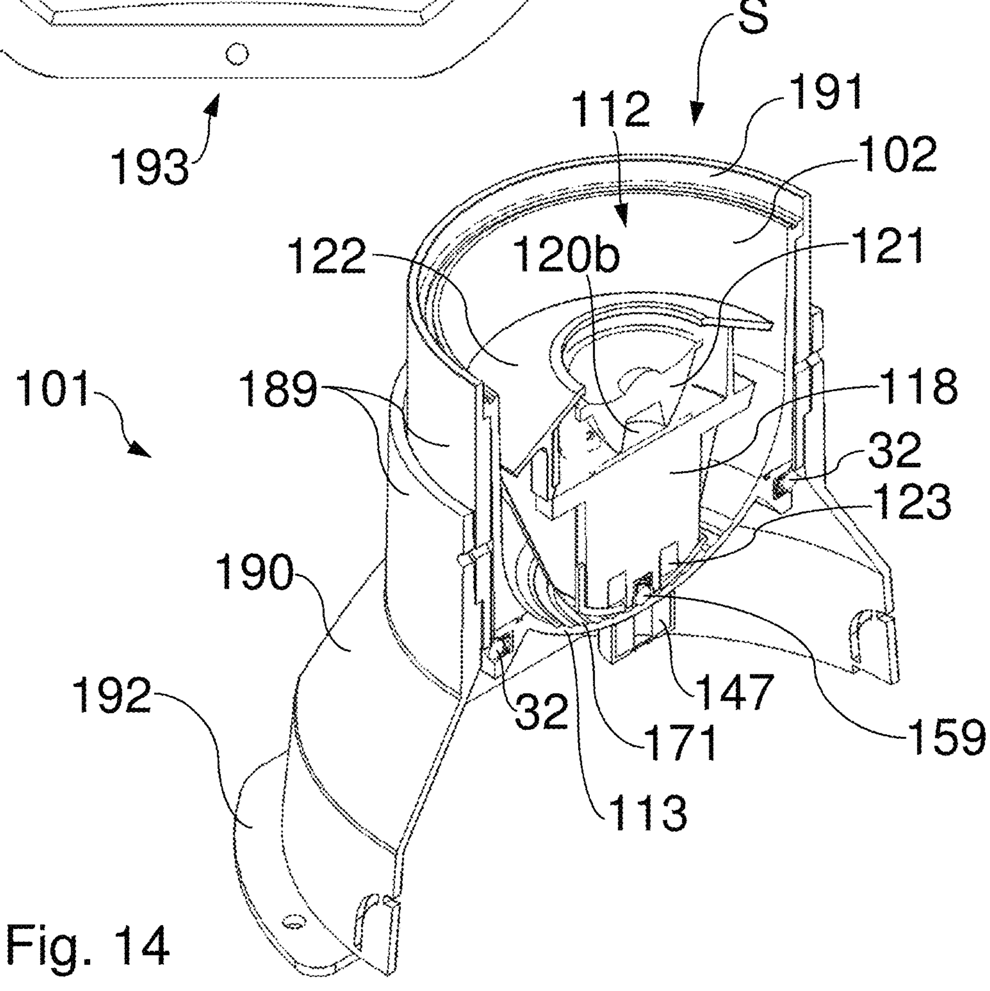
Figure 15:
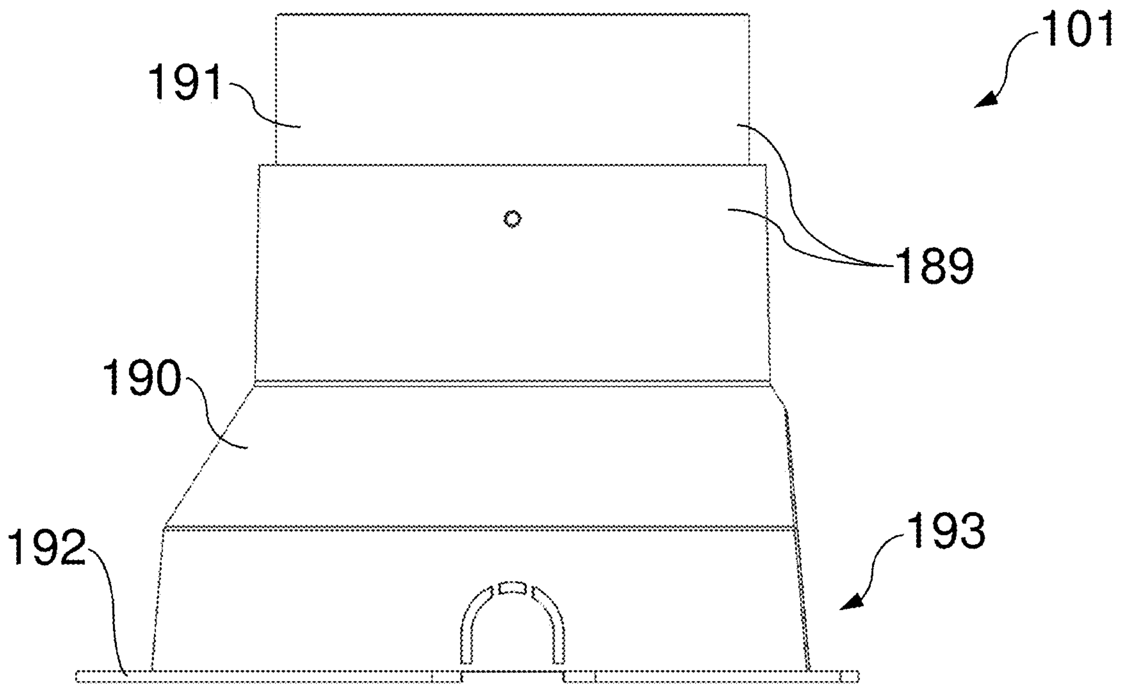
Figure 16:
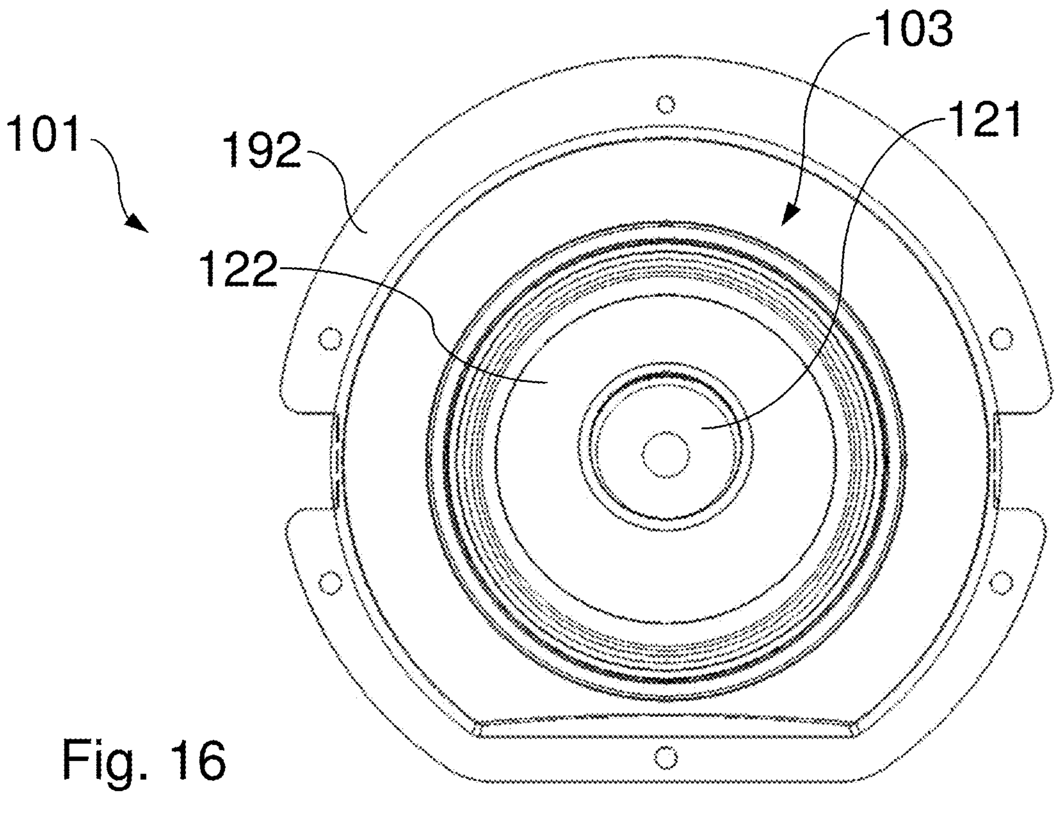
Figure 17:
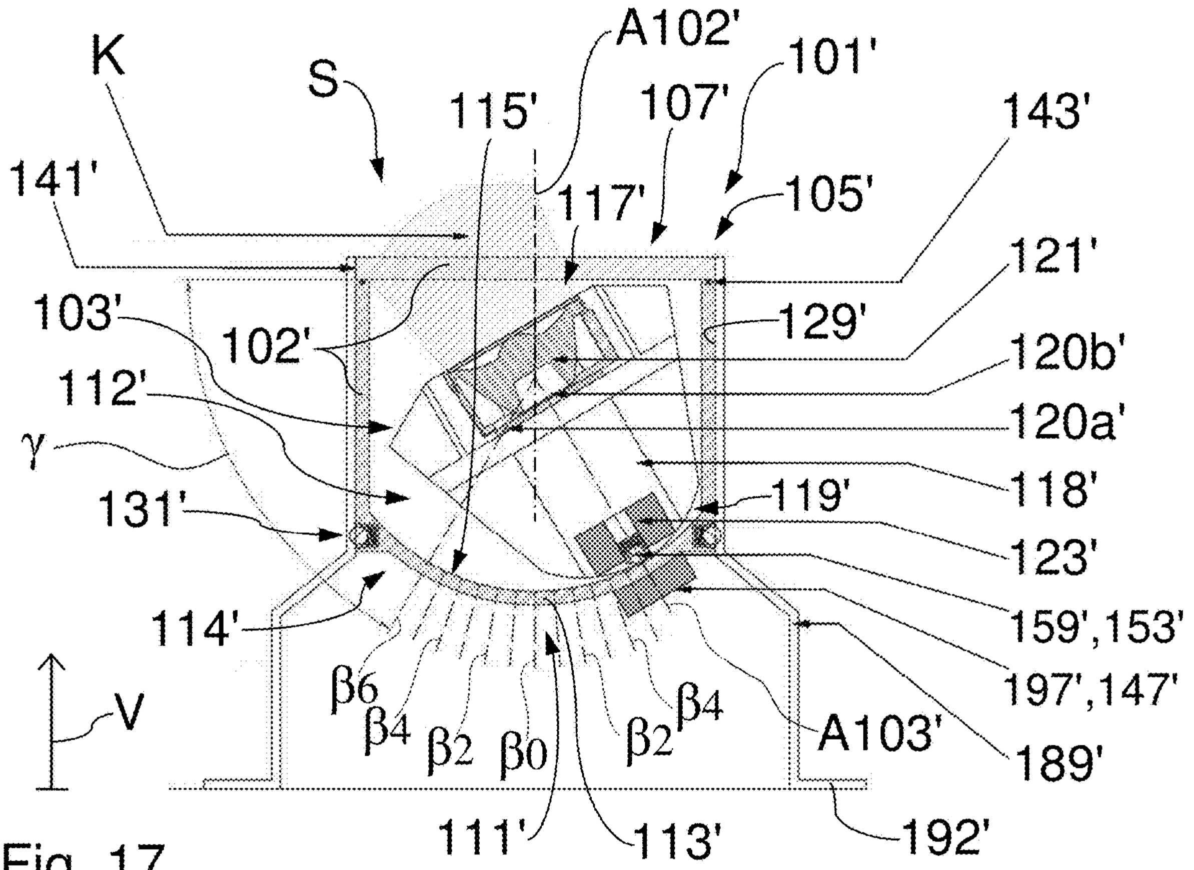
Figure 18:
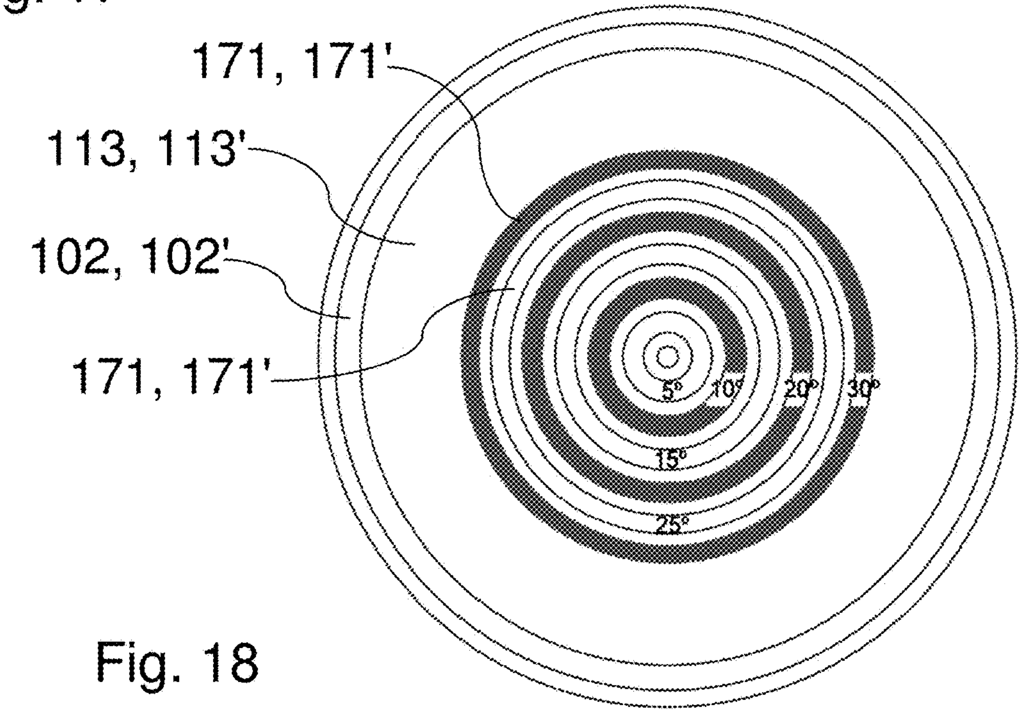
Figure 19:
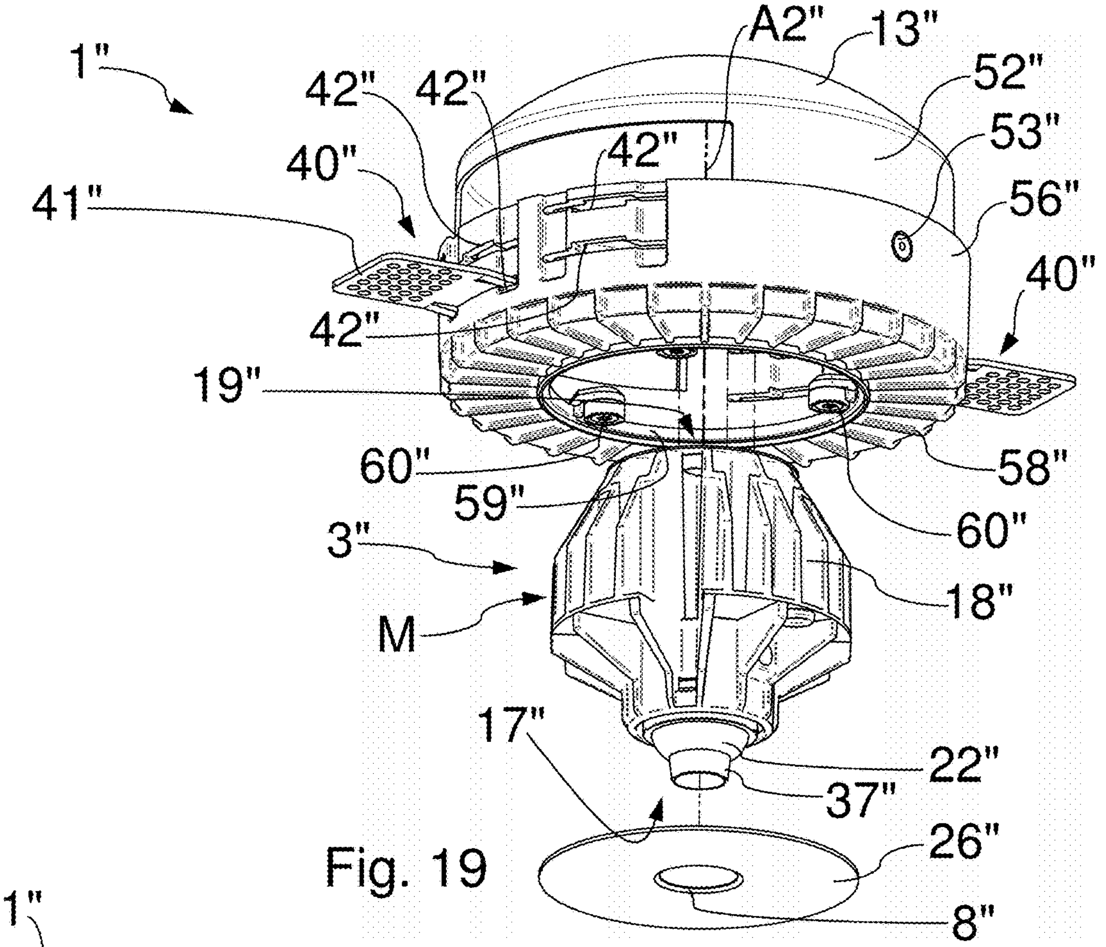
Figure 20:
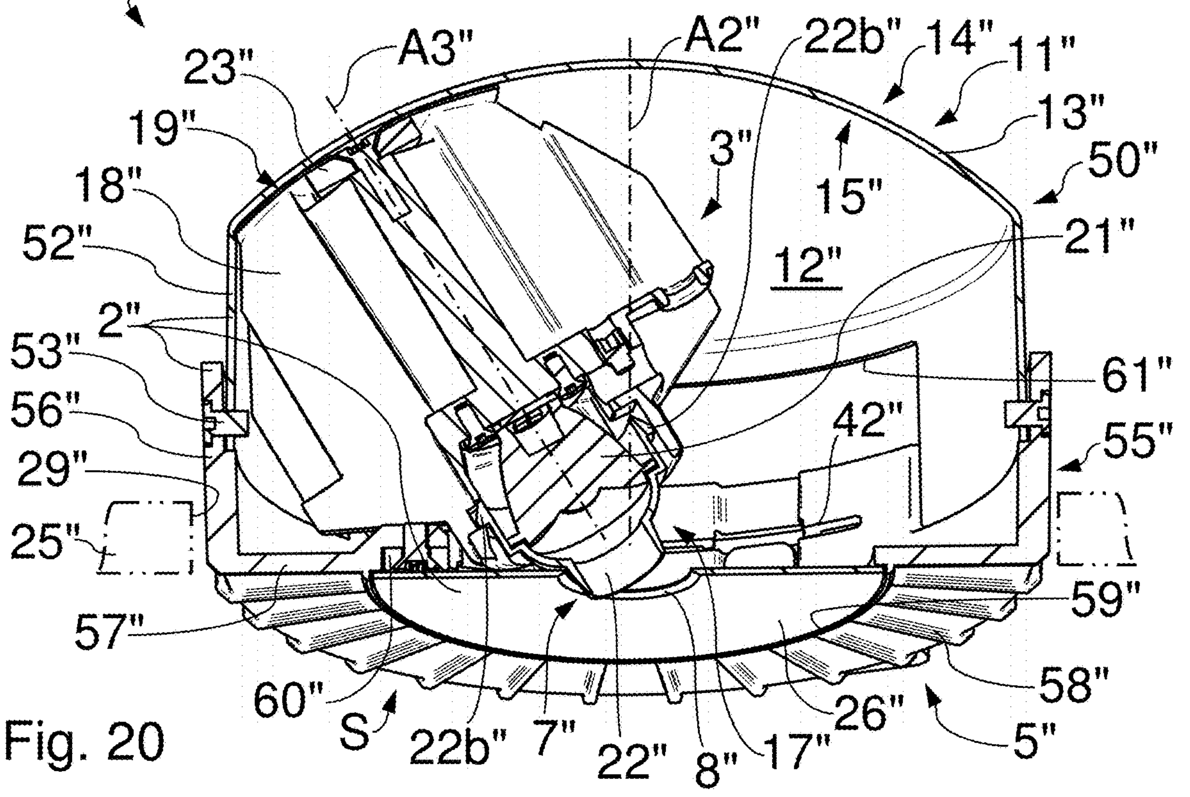

The invention is explained in more detail below with reference to the exemplary embodiments shown in the schematic figures of the drawings. The following are depicted:

FIG. 1 a central cross-section perspective view of a lighting device according to an initial exemplary embodiment;

FIG. 2 the lighting device in FIG. 1 seen perspectively from a visible side;

FIG. 3 the lighting device in FIG. 1 seen perspectively from the visible side, during the adjustment of the lighting unit;

FIG. 4 a lighting device according to a variant of the first exemplary embodiment, from the side, wherein a lighting unit is being adjusted for a main beam direction which is inclined by 20 degrees relative to the vertical;

FIG. 5 central cross-section of the lighting device in FIG. 4, wherein the lighting unit is being adjusted in the same way as in FIG. 4;

FIG. 6 central cross-section of the lighting device in FIG. 4, wherein the lighting unit is being aligned for a main beam direction along the vertical;

FIG. 7 the lighting device in FIG. 4 in a side view, during an adjustment of the lighting unit, with the main beam direction of emission aligned along the vertical;

FIG. 8 central cross-section of the lighting device in FIG. 4 during the adjustment of the lighting unit, with the main beam direction inclined by −20 degrees relative to the vertical;

FIG. 9 cross-section of a lighting device according to a second exemplary embodiment, wherein a lighting unit is being adjusted for a main beam direction which is inclined by 30 degrees relative to the vertical;

FIG. 10 the lighting device in FIG. 9 in a central section, the lighting unit being adjusted for a main emission direction which is inclined by 15 degrees relative to the vertical;

FIG. 11 the lighting device in FIG. 9 in a central section, the lighting unit being adjusted for a main emission direction along the vertical;

FIG. 12 a top view XII of the lighting device according to the second exemplary embodiment of FIG. 11;

FIG. 13 a bottom view XIII of the lighting device according to the second exemplary embodiment, see FIG. 11;

FIG. 14 a perspective view of the lighting device according to the second exemplary embodiment, cut in the middle, in the state of FIG. 11;

FIG. 15 a side view of the lighting device according to the second exemplary embodiment from the outside;

FIG. 16 a top view of the lighting device according to the second exemplary embodiment, wherein the lighting unit is aligned for an inclined main beam direction;

FIG. 17 central cross-section of a lighting device according to a variant of the second exemplary embodiment, in particular also to explain some tilt angles;

FIG. 18 a top view of an internal side of a rear dome-shaped housing wall of the lighting device according to the second exemplary embodiment and its variant;

FIG. 19 a perspective view of a lighting device according to a further variant of the first exemplary embodiment, with a lighting unit that is still outside of the lamp housing and a cover element that has not yet been attached to the lamp housing; and FIG. 20 a sectional view of the assembled lighting device in FIG. 19 with an inclined lighting unit.

The accompanying drawings are provided to clarify the embodiments of the invention. They illustrate the embodiments and, together with the description, serve to explain the principles and concepts of the invention. Other embodiments and many of the mentioned advantages will become apparent when consulting the drawings. The elements of the drawings are not necessarily shown at the same scale.

In the figures, elements, features and components which are identical and which have the same function and effect each have the same reference symbols, unless otherwise stated.

DESCRIPTION OF EXEMPLARY EMBODIMENTS

A lighting device 1' according to a first exemplary embodiment is illustrated in FIGS. 1-3. The device 1' is a built-in "downlight" variant. The lighting device 1' can be installed, for example, in a false ceiling in an internal space of a building, which is not shown here in its entirety, to illuminate the space. FIG. 1 shows a plate element 25' of such a false ceiling, which in this example mainly extends horizontally.

The lighting device 1' has a lamp housing 2' and a lighting unit 3'. The lamp housing 2' has an internal space 12', in which the lighting unit 3' is positioned. The lighting unit 3' is designed as a component which is independent from the lamp housing 2' and can be moved relative to the lamp housing 2'.

FIG. 1 shows that the lamp housing 2' in this exemplary embodiment is made up of a plurality of parts, with a front housing section seen from visible side S in FIG. 1 designed with a circular, plate-shaped cover element 26' and latched to a rear housing section. For this purpose, the plate-like cover element 26' continues away from the visible side S in a cylindrical section. A visible front side of the cover element 26' can preferably be painted over, for example in the desired colour of the ceiling. An outer circumference of the lamp housing 2' can be of essentially circular design.

A section of the rear housing section on the rear side 11' of the lamp housing 2' is designed as a curved, dome-shaped rear wall 13' made of steel as a ferromagnetic material.

An internal surface 15*a*' of the rear wall 13' on the internal side thereof is formed as part of a spherical surface. A curvature of the internal surface 15*a*' is therefore the same at every point on the rear wall 13' and is consequently constant. An outer surface of the rear wall 13' on the external side 14' thereof is also formed as part of a spherical surface, with the result that the wall thickness of the rear wall 13' is essentially uniform. The rear wall 13' of the device 1' can be produced expediently, but a spherical segment-shaped outer surface of the rear wall 13' is not absolutely necessary in the exemplary embodiment in FIGS. 1-3.

The internal space 12' of the lamp housing 2' shown in FIG. 1 is therefore delimited by a flat front wall 26', the essentially spherical cap-shaped rear wall 13' and an essentially cylindrical section between the front wall 26' and the rear wall 13'.

When the lighting device 1' is mounted as shown in FIGS. 1-3, the lamp housing 2' ends essentially flush with a surface 27' of the plate element 25' surrounding the lamp housing 2'. FIG. 2 in particular shows the restrained, aesthetic and unobtrusive installation, in which the lighting unit 3' is barely visible to a viewer in the illuminated space.

In FIG. 1, a central axis A2' of the lamp housing 2' essentially runs along a vertical direction V and through a centre point of the cover element 26', wherein the cover element 26' forming the front housing wall and the rear wall 13' are essentially rotationally symmetrical in relation to the axis A2'.

The lamp housing 2' is equipped on its circumference with several ball plungers 31', each of which has a ball 32' which is spring-loaded in the radial direction. In the first exemplary embodiment, four ball plungers 31' are arranged on the periphery of the lamp housing 2' at intervals of 90 degrees around the housing central axis A2', thus, enabling the lamp housing 2' to be supported uniformly.

With the help of the ball plunger 31', the lamp housing 2' is mounted in a recess 29' in the plate element 25', for example an intermediate ceiling, in a simple and easily detachable manner. For this purpose, the balls 32' of the ball plunger 31' latch onto a suitable groove or behind a suitable offset in the recess 29'.

A frame-like assembly set 35' can also be provided for the flush fastening of the lamp housing 2' in the recess 29', which can provide, for example, an offset or an edge to click the balls 32' into place.

The lighting unit 3', which can be moved in the internal space 12', has a heat sink 18' featuring a printed circuit board ("PCB") 20*a*' with an LED device 20*b*' for light generation. The lighting unit 3' also has a lens 21' positioned in front of the LED device 20*b*' in the direction of the light emission which is surrounded on the front, light-emitting side device by a funnel-like cover and beam-limiting element 22' with a central tube extension 22*a*'. The heat sink 18', the circuit board 20*a*' with the LED device 20*b*', the lens 21' and the cover and beam-limiting element 22' are arranged concentrically along a central axis A3' of the lighting unit 3' in this order towards the light output side 17' of the lighting unit, wherein the axis A3' also coincides with a central axis of the tube extension 22*a*', which is equipped with a circular internal cross section.

This has a light emission area 7' on the light output side 5' of the lamp housing 2'. During operation, the lighting unit 3' emits light on the light output side 17' of the lighting unit 3' through the tube extension 22*a*', wherein the light emitted in this way is directed outwards through the light emission area 7', i.e. into the room to be illuminated. For this purpose, the cover element 26' has a central, preferably circular, light emission opening 8', which enables the light emitted by the lighting unit 3' to leave the unit. FIGS. 1-3 show that the aperture 8' is accessible from the visible side S when the lighting device 1' is in the assembled state.

The lens 21' is designed in such a way that the light generated by the LED device 20*b*' passes through the relatively narrow inner channel of the tube extension 22*a*' and the relatively small light emission opening 8' to the outside on visible side S as a cone of light K with a relatively large cone opening angle, for example from between about 20 degrees and about 40 degrees. This contributes to the fact that the light source is not or barely visible to the viewer. In this case the lens 21' is designed, for example, in such a way that the lens 21' focuses the light entering it from the LED device 20*b*' at a downstream location, thereby allowing a narrow exit opening 8' to be used despite large distances. This avoids non-aesthetic visible points of light.

A diameter D8' of the light emission opening 8' is relatively small compared to the surface area of the cover element 26' and in some examples can be in a range from about 11 mm to about 15 mm, with D8' being about 12 mm or 13.5 mm or between and including 12 mm and 13.5 mm.

The curved, dome-shaped rear wall 13' of the lamp housing 2' is positioned on the rear side 11' of the lamp housing 2' facing away from the light output side 5'. In the lighting device 1', the lighting unit 3' is magnetically attached to the dome-like curved wall 13' of the installation housing 2' on the inside, wherein the exit beam angle or main beam direction A of the lighting unit 3', for example along the central axis of the cone of light K, in relation to the lamp housing 2', and thus the beam angle in the sense of an inclination of the main beam direction A relative to the axis A2' in a plane that contains the axis A2', as well as the beam angle in the sense of a rotation of the main beam direction A about the axis A2' in the circumferential direction, can be adjusted by moving the lighting unit 3' along the dome-like rear wall 13'.

In order to attach the lighting unit 3' to a selectable location on the rear wall 13' using a magnetic force and to thereby enable the adjustment of the beam direction A, the rear side 19' of the lighting unit 13' facing away from the light output side 17' of the lighting unit 13' has a permanent magnet 23' attached to the heat sink 18', for example by means of a screw connection, which can interact with and adhere magnetically to the ferromagnetic rear wall 13'. The magnet 23' is, for example, ring-shaped and is generally positioned concentrically to the heat sink 18', the circuit board 20*a*', the lens 21' and the element 22' on the rear side of the heat sink 18'.

To adjust the beam direction A, the rear side 19' of the lighting unit 3' is moved and displaced along the curved rear wall 13' with the aid of an adjustment tool 97', which has an elongated tubular design. One end of the tool 97' may be snugly inserted into the interior channel of the tube extension 22*a*' to make adjustments. The tube extension 22*a*' therefore serves not only as a light outlet, but also as a coupling device 37' on the light output side 17' for the temporary engagement of the tool 97' during the adjustment process. In this way, the elongated tool 97' is inserted on the visible side S into the aperture 8' to enable the continuous adjustment of the beam direction A, and therefore the beam angle. In the exemplary embodiment shown in FIGS. 1-3, the beam direction A can be adjusted by +/− 30 degrees by tilting the axis A3' relative to axis A2', wherein it is possible to rotate the axis A3' around the axis A2' by 360 degrees. Tilting by +/− 30 degrees is thus possible in all radial planes through axis A2'. These possible movements are indicated schematically in FIG. 3 and denoted by reference symbol B. After the adjustment process, the tool 97' is removed from the tube extension 22*a'*.

Due to the spherical curvature and therefore the constant curvature of the rear wall 13' in all directions, shifting the rear side 19' of the lighting unit 3' by a certain distance always leads to a constant, equal change in the beam angle in relation to the axis A2'.

The bar tool 97' is hollow on the inside and therefore has a continuous opening 98' in the longitudinal direction like a tube. During the adjustment, light 99' (see FIG. 3) which is emitted by the lighting unit 3' can exit through the aperture 98'. A point of light is thrown into the room, which makes the current beam direction A clear to the operator making the adjustment and helps them to adjust the direction. The light beam angle can therefore be clearly determined by the operator in a simple way during adjustment.

Alternatively, the tool 97' could be designed in the form of a rod without a longitudinal continuous opening if the emission of light 99' during adjustment is not desired.

A lighting device 1 according to a variant of the first exemplary embodiment is illustrated in FIGS. 4-8. The explanations provided above for FIGS. 1-3 also apply to FIGS. 4-8, with the differences described below. In FIGS. 4-8, elements and features which have already been described in relation to FIGS. 1-3 are denoted by the same reference symbols, but in each case without inverted commas.

The lighting device 1 in FIGS. 4-8 in particular differs from the device 1' in that in the lighting device 1, the lamp housing 2 has access openings 61 in an area between the light output side 5 and the curved, dome-shaped rear wall 13. Due to the access openings 61 penetrating a side wall of the lamp housing 2, the lamp housing 2 is largely laterally open in this area. In addition, the overall height of the lamp housing 2 in relation to its diameter is selected to be greater than that of the lamp housing 2'.

A control device 80 ("driver") for powering the lighting unit 3 is located outside of the lamp housing 2. In the case of the lighting device 1, a wire 65, in particular a flexible cable, which is only shown in a schematically simplified way in FIG. 7, is routed through the access opening 61 into the internal space 12 for the electrical supply of the lighting unit. In this way, the wire 65 connects the lighting unit 3 to the control device 80, which is positioned outside of the lamp housing 2 and is also only shown in a schematically simplified way in FIG. 7.

In the two variants of FIGS. 1-8, the lighting unit 3', 3 is designed in such a way that the lighting unit 3', 3 extends in a longitudinal section along the axis A3' or A3 from the light output side 17', 17 to the rear side 19', 19, initially expanding in the radial direction and then tapered again. The maximum radial dimension of the lighting unit 3', 3 is closer to the light output side 17', 17 than the rear side 19', 19. This design enables collision-free tiltability within the angular range described above of, for example, +/− 30 degrees in relation to the axis A2', A2 while at the same time providing sufficient space for a heat sink 18, 18', which enables effective heat dissipation. The heat sink 18, 18' is formed with a corner E in the longitudinal section in the area of the maximum radial dimension of the heat sink.

In the case of the lighting device 1 in FIGS. 4-8, the lighting unit 3 is largely located inside of the internal space 12 of the lamp housing 2, whereas the tube extension 22*a* of the lighting unit 3, which is in other cases positioned in the same way as the exemplary embodiment in FIGS. 1-3, protrudes slightly from the light emission opening 8, see FIG. 4-8. In contrast, the device 1' of FIGS. 1-3, features a lighting unit 3' located fully within the internal space 12', wherein part of the tube extension does not project through the aperture 8', either with straight orientation of the lighting unit along the axis A2' or in an inclined position.

In the case of variant of FIG. 4-8, the beam direction A is adjusted in the same way as in FIG. 1-3 using a tubular tool 97, the inner passage 98 of which in turn allows light 99 to exit the end of the tool 97 during adjustment and makes it easier for the operator to make the adjustment, see FIGS. 7 and 8. In turn, the axis A3 of the lighting unit 3 can, as shown in the example in FIGS. 1-3, be inclined by an angle β of up to approximately 30 degrees relative to the axis A2 of the lamp housing 2 in all radial planes in which the axis A2 lies. In turn, the axis A2 in FIG. 5 runs parallel to the vertical V, for example.

The lamp housings 2', 2 in the variants described above are intended for installation in a recess 29', 29 and in the cavity located behind the plate element 25', 25, wherein installation, for example in a ceiling, wall or floor could be considered. The plate element 25', 25 can therefore be used as a wall or ceiling or floor component. Alternatively, it is also conceivable to mount the lamp housing 2', 2 in an outer housing, which is not shown in the figures.

19 and 20 show a lighting device 1" according to a further variant of the first exemplary embodiment. In FIGS. 19 and 20, elements and features which have already been described for FIGS. 1-8 are denoted by the same reference symbols, but in each case with double inverted commas. The differences between this variant and those of FIGS. 1-8 are described below, with reference to the above explanations.

The lighting device 1" has a lamp housing 2" which is attached to a mounting position in a different way than the housing 2, 2'. No separately provided assembly set is used in the variant in FIGS. 19, 20. Instead, the lamp housing 2" has fastening devices 40" which enable the lamp housing 2" to be fastened within a recess 29" in a plate element 25". The fastening devices 40" each feature a tab element 41" and a plurality of mutually offset channels 42", into which an end section of the tab element 41" can be selectively inserted. The channels 42" allow adaptation to different thicknesses of the plate element 25". In other words, the assembly set is integrated into the lamp housing 2".

The lamp housing 2" in FIGS. 19-20 has an initial rear-side housing section 50" and a second, front-side housing section 55", both of which are connected using fasteners 53", for example screws. The channels 42" are arranged circumferentially on the front housing section 55".

The rear-side housing section 50" is made of steel, for example, and has a curved, dome-shaped rear wall 13" with an external side 14" and an internal side 15" in the same way as the rear wall 13, 13', which is attached to a peripheral, cylindrical wall section 52" connects. The front housing section 55" has an encircling, cylindrical wall section 56" and a plate-like wall section 57" which essentially extends perpendicularly to the wall section 56", delimits an internal space 12" in sections at the front and runs around one edge of the wall section 56". The channels 42" are in the wall section 56". On the outside, the wall section 57" features radial ribs 58" which, when the wall section 57" is filled, cemented or plastered in, are covered with filler, cement or plaster and facilitate adhesion.

The front housing section 55" has a central, in particular circular, aperture 59" which allows access to the internal space 12". After mounting the lamp housing 2" in the recess 29", a lighting unit 3" can, for example, be easily introduced into the internal space 12" through the aperture 59", see FIG. 19. A magnet 23" on a rear side 19" of the lighting unit 3" enables the lighting unit 3" to be attached and adjusted inside on the curved rear wall 13".

The lamp housing 2" also has a cover element 26", which is designed as a flat and circular disc formed with a metal material, for example steel, in FIGS. 19 and 20. The cover element 26" can be fitted into the aperture 59" and has a central, in particular circular, access opening which serves as a light emission opening 8". In order to fasten the cover element 26" to the second housing section 55", several holding magnets 60", for example three, are arranged adjacent to an edge of the aperture 59" and distributed along its circumference. After the lighting unit 3" has been introduced, the cover element 26" can be magnetically fastened using the magnets 60" and the housing section 55" can then be closed on the visible side, except for the aperture 8".

A light emission area 7" is formed with the light emission opening 8" on a light output side 5" of the housing 2". The rear wall 13" is on a rear side 11" of the housing 2", facing away from the light output side 5". The lighting unit 3" can shine light onto a light output side 17" in order to emit the beam through the light emission area 7", wherein the rear side 19" also faces away from the light output side 17" in FIGS. 19 and 20.

In the longitudinal section of the lighting unit 3", the heat sink 18" of the lighting unit 3" has an area which forms an axial middle area M of the lighting unit 3" between the light output side 17" and the rear side 19" and in which the maximum radial dimension of the heat sink 18" and thus also of the lighting unit 3" is essentially constant and decreases on both sides of this area along the axis A3" of the lighting unit 3", which in turn makes possible a good, collision-free tiltability of +/− 30 degrees, for example, in relation to the axis A2".

As in FIGS. 1-8, the lens 21" designed as described above for the lenses 21, 21' is surrounded on its light-emitting side by a funnel-like cover and beam-limiting element 22", wherein FIG. 20 shows that the element 22 is fitted with locking devices **22*b*" and is attached to this using a catch as part of the lighting unit 3". A tool 97, 97' is also used for adjustment in the variant in FIGS. 19-20**, as described above.

Analogously to the example in FIGS. 4-8, the lamp housing 2" has at least one access opening 61" which allows a supply line for the lighting unit 3" to be passed through. The access opening(s) 61" is/are formed in FIGS. 19-20 as cutouts in the wall section 52" starting from its edge coupled to the second housing section 55".

The devices 1', 1, 1" are ideally designed for use inside a building. For outdoor applications, lighting devices 101, 101' according to a second exemplary embodiment and a variant thereof are described below with reference to FIGS. 9-18. The lighting devices 101, 101' are each designed as a light which is protected against the ingress of water and dust, wherein the protection can correspond, for example, to an IP protection class suitable for the type of use. In the case of the lighting devices 101, 101', instead of an accessible opening—which in FIGS. 1-8 and 19-20 allows adjustment by means of a mechanical intervention of a tool—there is a counter-magnet on the external side of a rear wall of a partially dome-shaped, curved housing 102, 102'—which in this case is not formed from a ferromagnetic material but, for example, from an aluminium material or a plastic material.

9-16 show the lighting device 101 according to the second exemplary embodiment, which has a lamp housing 102 and a lighting unit 103 arranged completely within an interior space 112 of the lamp housing 102 when ready for operation. The internal space 112 is closed off from the outside and sealed against the ingress of water and/or dust from the outside. In this way, the lighting unit 103 can be effectively protected against the ingress of moisture and/or dirt when used outdoors.

The lamp housing 102 is formed with a light emission area 107 on a light output side 105 thereof. Furthermore, the lamp housing 102 has a curved, dome-shaped or cupola-like rear wall 113 on a rear side 111 that faces away from the light output side 105.

In the second exemplary embodiment, unlike the first embodiment, the housing 102 is illustrated in an example position in which the rear wall 113 faces downward. This illustration is chosen with a view to the exemplary application in the area of a floor, which will be explained in more detail below, but the housing 102 can instead be oriented differently in other applications.

In the light emission area 107, the lamp housing 102 has a translucent cover 141, which is, for example, a translucent or transparent pane, such as a glass pane, and by means of which the lamp housing 102 is tightly closed on the light output side 105. The cover 141 is sealed against other housing components with a seal 143, which is made of silicone, for example.

The lighting unit 103, which can be moved in the internal space 112, has a heat sink 118, wherein a printed circuit board **120*a* featuring an LED device 120, a lens 121 and a cover element 122 are substantially arranged concentrically to each other and the heat sink 118 along a central longitudinal axis A103 of the lighting unit 103**.

During operation, the lighting unit 103 emits light on a light output side 117 of the same, which is generated by the LED device **120*b* and directed and/or focused in the desired manner by the lens 121 arranged in the output direction A in front of the LED device 120*b*. The cover element 122 has a central, circular access opening, see FIG. The cover element 122** also has a conical surface section that extends in a ring shape around the access opening.

FIG. 9 shows that the lighting unit 103 is arranged in the internal space 112 in such a way that it can let the light emitted on its light output side 117 shine through the light emission area 107 of the lamp housing 102 and thereby through the cover 141. The light emission area 107 of the housing 102 in the second exemplary embodiment is larger than the light emission opening 8, 8', 8" in the first exemplary embodiment and its variants and essentially occupies the entire diameter of the lamp housing 102 on its light output side 105. While the lens 21, 21', 21" in the first exemplary embodiment is ideally adapted for diffusion through small or narrow apertures, this is not required in the same way for the lens 121. The lens 121 is therefore of a different type than the lenses 21, 21', 21" in preferred exemplary embodiments.

Furthermore, a rear side 119 of the lighting unit 103, which is opposite the light output side 117 and thus faces away, features a permanent magnet 123, which is ring-shaped, for example, with the central longitudinal axis A103 of the lighting unit 103 coinciding with a central axis of the magnet 123. The magnet 123 can be screwed to the heat sink 118, for example. Using the magnet 123, the lighting unit 103 is attached to a selectable location on the rear wall 113 of the lamp housing 102, wherein a selected alignment of the axis A103 of the lighting unit 103 and thus a selected main beam direction A is fixed and is adjustable.

The adjustment of the beam direction A and the fastening of the lighting unit 103 is accomplished in the second exemplary exemplary embodiment using a tool 197 provided for this purpose. The tool 197 also has a permanent magnet, which can interact with the magnet 123 by attracting one another using, for example, a counter-magnet 147 in the shape of a ring or disk. By arranging and moving the tool 197 and thus the counter-magnet 147 on the external side 114 of the rear wall 113, the orientation of the axis A103 is adjusted by moving the rear side 119 along the rear wall 113 without needing to access the internal space 112. The attraction between the magnets 123, 147 pulls the rear side 119 of the lighting unit 103 against an internal side 115 of the rear wall 113, as a result of which the selected orientation of the lighting unit 103 is also fixed. This allows the lighting unit 103 can be effectively protected against the effects of external moisture and dirt by sealing the housing interior 112. Direct mechanical access is avoided.

The lighting device 101 of the second exemplary embodiment is also designed as a built-in light, wherein the lamp housing 102 is designed to be accommodated and installed in a cavity or a recess 129 in an outer housing 189. This in turn has four ball plungers 131 to mount the lamp housing 102, which are arranged uniformly around the circumference of the housing 102 and are each spaced at 90 degrees to each other, each featuring a spring-loaded ball 32 which enables the detachable lamp housing 102 to be snapped into the outer housing 189; cf. the example the sectional views in FIGS. 9-11 and FIG. 14.

The outer housing 189 can in particular be accommodated in the floor area. In this case, a central housing axis A102 can run along a vertical direction V, see FIG. 9, in which case the lighting device 101 can shine upwards in different directions from the perspective of the viewer. An alternative installation in the area of a wall or ceiling outdoors is also conceivable.

In the installed state, see for example FIG. 10, the lamp housing 102 closes with its outer surface on the light output side 105 essentially flush with a surface 127 in the vicinity of the installed light housing 102. The surface 127 can be, for example, a floor surface, wherein a cavity to receive the outer housing 189 can be created in the floor. However, surface 127 could be a wall or ceiling surface for wall or ceiling mounting, for example.

Another ball plunger 153 is also arranged concentrically in relation to the axis A103 in the centre on the rear side 119 of the lighting unit 103 and is surrounded by the ring-shaped magnet 123. The ball plunger 153 helps with the adjustment. A spring-loaded ball 159 of the ball plunger 153 acts on an internal side 115 of the curved, dome-shaped rear wall 113. An internal surface on the internal side 115 of the rear wall 113 is formed as part of a spherical surface. An outer surface on the external side 114 is also curved in the shape of a dome and is designed as part of a spherical surface. However, while the rear wall 113 is essentially smooth on the external side 114 and enables the tool 197 to be moved smoothly on the external side 114, the internal side 115 of the rear wall 113 has a plurality of concentric grooves 171 in which the balls 159 can engage by locking in a detachable manner.

In this way, the tilt angle of the axis A103 of the lighting unit 103, and thus the main beam direction A, can be adjusted in predefined stages in relation to the housing axis A102 through the interaction of the ball plunger 153 and the grooves 171 in the rear wall 113, which is made of a non-ferromagnetic material, in particular a plastic or aluminium or an aluminium alloy, and through the attraction of the two magnets 123 and 147 to each other. At the same time, the axis A103, and thus the main beam direction A, can be continuously rotated about the vertically oriented housing axis A102, wherein the ball 159 runs in the groove 171 in which it is currently engaged. The grooves 171 may be spaced such that the tilt angle of the axis A103 is adjustable in increments of, for example, 5 degrees.

However, the grooves 171 can be omitted in variants of the second exemplary embodiment, which then allows the tilt angle of the axis A103 to the axis A102 to be adjusted in an infinitely variable manner. In such a variant, the ball plunger 153 can be retained in order, for example, to enable the rear side 119 of the lighting unit 103 to be moved more easily along the rear wall 113.

The lighting unit 103 initially widens radially in a longitudinal section of the same from the light output side 117 to the rear side 119 and then narrows again. As in the first exemplary embodiment in FIGS. 1-3 and its variant in FIGS. 4-8, in the lighting unit 103 an area of a maximum radial dimension of the lighting unit 103 is formed closer to the light output side 117 than to the rear side 119, see for example 11 It is therefore possible to accommodate a heat sink 118, which can effectively dissipate the heat generated by the LED device 120*b* and at the same time achieve adjustability within the desired angular range. In the second exemplary embodiment, the lighting unit 103 also has a corner E in the area of the maximum radial dimension.

In the case of the lighting device 101, a wire, which is not shown in the figures, for the electrical supply of the lighting unit 103 is fed out through a sealed channel 167 from the internal space 112 of the lamp housing 102. The sealed channel 167 is located on the rear side 111 of the lamp housing 102, penetrates the rear wall 113 and is sealed separately, for example using a screw connection. In the second exemplary embodiment, a control device or "driver" (not shown in the drawing) can be located outside of the lamp housing 102 and is connected to the lighting unit 103 using the wire in the manner described above.

On the rear side 111 of the housing 102, a small area occupied by the channel 167, see FIG. 13, is therefore not accessible to the counter-magnet 147 and subsequently also the tool 197. If the lighting unit 103 is to be adjusted into a position for which the tool 197 would need to be placed in the area of the channel 167, this can be achieved during assembly by inserting the housing 102 into the outer housing 189 in a rotated manner, for example by rotating it approximately 90 or 180 degrees. In this way, all desired beam angles can be achieved in the sealed second exemplary embodiment.

Outer housing 189 may be formed with an outer, lower portion 190 and an inner, upper portion 191, as diagrammatically illustrated in FIGS. 9-16. The lower part 190 can form a base-like element, which can be placed, for example, in a floor area, for example in a channel in the floor, and can be fastened using a flange 192 with fastening openings at the lower end of the part 190. The lower part 190 is wider towards the bottom, giving it a stable footing, and is hollow on the inside. In the upper region of the lower part 190, the upper part 191 is accommodated in sections as an insert, see for example FIG. 14, wherein the upper part 191 is also hollow inside and accommodates the lamp housing 102. The lamp housing 102 can be latched onto the upper part 191 using the ball plunger 131, wherein the balls 32 click into a rear edge of the part 191.

As is particularly clear in the top view, the lower part 190 of the outer housing 189, see for example FIGS. 11-13, has a flat side 193 that facilitates placement of the outer housing 189 near walls, for example, near an outer wall of a building. This can be useful if the lighting unit 103 is equipped with lenses that form a narrow cone of light and need to be placed close to the wall to create a lighting effect.

17, 18 also illustrate a lighting device 101' according to a variant of the second exemplary embodiment, the above explanations relating to FIGS. 9-16 also being applicable to FIGS. 17 and 18, with the differences described below. In FIGS. 17, 18, elements and features which have already been described in relation to FIGS. 9-16 are denoted by the same reference symbols but with an additional inverted comma.

In the case of the lighting device 101', the outer housing 189', as another example, is in particular shaped symmetrically and is designed as one piece, see FIG. 17. The lamp housing 102' is therefore inserted directly into the hollow and tube-like outer housing 189' from above and is fixed in a detachable manner using the ball plunger 131'.

In the variant of FIGS. 17, 18, a gradual adjustment of the tilt angle β of the central longitudinal axis A103' of the lighting unit 103' in relation to the axis A102' of the lamp housing 102' is also provided. As also illustrated in the top view of FIG. 18, a gradual adjustment in 5-degree increments is possible with the aid of concentric grooves 171'. Some possible setting angles β6=βmax=30 degrees, β4=20 degrees, β2=10 degrees and β0=0 degrees are shown in FIG. In the example shown in FIG. 17, an angle of γ=90 degrees−βmax=60 degrees thus remains between the horizontal and the maximum tilt angle βmax.

FIG. 17 also illustrates the cone of light K generated by the lighting unit 103' during operation, which is emitted out of the device through the cover 141'.

In the second exemplary embodiment and its variants, the beam direction A can be tilted by up to approximately 30 degrees in relation to the axis A102, A102' of the lamp housing 102 and can also be rotated about the axis A102, A102' as described above.

Although the present invention has been fully described above with reference to the preferred exemplary embodiments, it is not limited to these exemplary embodiments and can be modified in a variety of other ways.

Variants with infinitely variable or gradual adjustability are in particular conceivable in embodiments for both outside and internal use. For example, in the case of gradual adjustability of the beam direction from the rear side of the lighting unit, an additional, centrally arranged ball plunger could also be provided in an embodiment for the interior in order to implement the gradual adjustability. The rear wall 13', 13, 13'' in the first exemplary embodiment can thus have concentric grooves 171 in a further variant along the same lines as the second exemplary embodiment.

In addition, it should be noted that although the present invention can be favourably used for lights intended for use in a recess, the invention is not limited to recessed lights. Furthermore, although it is favourable to attach the lamp housing so that it can be detached using the ball plunger described above, the lamp housing can also be attached in other, equally useful ways.

REFERENCE LIST

1, 1', 1'' Lighting device
2, 2', 2'' Lamp housing
3, 3', 3'' Lighting unit
5, 5', 5'' Light output side
7, 7', 7'' Light emission area
8, 8', 8'' Light emission opening
11, 11', 11'' Rear side (lamp housing)
12, 12', 12'' Internal space (lamp housing)
13, 13', 13'' Rear wall (lamp housing)
14, 14', 14'' External side (rear wall)
15, 15', 15'' Internal side (rear wall)
15*a*, 15*a'* Internal surface
17, 17', 17'' Light output side (lighting unit)
18, 18', 18'' Heat sink
19, 19', 19'' Rear side (lighting unit)
20*a*, 20*a'* Circuit board
20*b*, 20*b'* LED device
21, 21', 21'' Lens
22, 22', 22'' Cover and beam-limiting element
22*a*, 22*a'* Tube extension
22*b''* Locking device
23, 23', 23'' Magnet
25, 25', 25'' Plate element
26, 26', 26'' Cover element
27, 27' Surface (plate element)
29, 29', 29'' Recess
31, 31' Ball plunger
32, 32' Ball
35' Assembly set
37, 37', 37'' Coupling device
40'' Fastening device
41'' Tab element
42'' Channel
50'' First housing section
52'' Wall section
53'' Fastener
55'' Second housing section
56'' Wall section
57'' Wall section
58'' Rib
59'' Aperture
60'' Holding magnet
61, 61'' Access opening
65 Wire
80 Control device
97, 97' Tool
98, 98' Continuous opening
99, 99' Light
101, 101' Lighting device
102, 102' Lamp housing
103, 103' Lighting unit
105, 105' Light output side
107, 107' Light emission area
111, 111' Rear side (lamp housing)
112, 112' Internal space (lamp housing)
113, 113' Rear wall (lamp housing)
114, 114' External side (rear wall)
115, 115' Internal side (rear wall)
117, 117' Light output side (lighting unit)
118, 118' Heat sink
119, 119' rear side (lighting unit)
120*a*, 120*a'* Circuit board
120*b*, 120*b'* LED device
121, 121' Lens
122 Cover element
123, 123' Magnet
127 Surface
129, 129' Cavity
131, 131' Ball plunger

141, 141' Cover
143, 143' Seal
147, 147' Counter-magnet
153 Ball plunger
159, 159' Ball
167 Sealed channel
171, 171' Groove
189, 189' Outer housing
190 Outer section
191 Inner section
192, 192' Flange
193 Flat side
197, 197' Tool
A Main beam direction
A2, A2', A2" Axis (lamp housing)
A102, A102' Axis (lamp housing)
A3, A3', A3" Axis (lighting unit)
A103, A103' Axis (lighting unit)
B Movement
D8' Diameter
E Corner
K Cone of light
M Middle area
S Visible side
V Vertical
β Light beam angle
β max Maximum tilt angle
β0, β2 Angle
β4, β6 Angle
g Angle

The invention claimed is:

1. Lighting A lighting device (1") with a lamp housing (2") and a lighting unit (3"), wherein the lamp housing (2") on a light output side (5") thereof has a light emission area (7") and the lamp housing (2") on a side (11") thereof opposite to the light output side (5") has a curved, dome-shaped rear wall (13");

wherein the lamp housing (2") further includes a cylindrical wall section (52", 56") between the curved, dome-shaped rear wall (13") and the light output side (5") of the lamp housing (2");

wherein the lighting unit (3") is set up to emit light on a light output side (17") thereof in order to transmit the light through the light emission area (7") of the lamp housing (2");

wherein the lighting unit (3") comprises a heat sink (18");

wherein the lighting unit (3") on a rear side (19") facing away from the light output side (17") thereof has at least one device (23"), which is used to attach the lighting unit (3") to a selectable point on the rear wall (13") of the lamp housing (2") by means of a magnetic force, as a result of which a beam direction (A) of the lighting unit (3") can be adjusted in relation to the lamp housing (2");

wherein the beam direction (A) of the lighting unit (3") is adjusted by moving the rear side (19") of the lighting unit (3") along the curved, dome-shaped rear wall (13") of the lamp housing (2");

wherein the lamp housing (2") has a cover element (26"), which is formed with the light emission area (7") and is positioned to cover an opening (59") in the lamp housing (2") on the light output side (5") which enables the lighting unit (3") to be inserted into an internal space (12") of the lamp housing (2") through the opening (59");

wherein the cover element (26") for covering the opening (59") is magnetically attachable;

wherein the cover element (26") is configured to be fitted into the opening (59") and has a central access opening that serves as a light emission opening (8"), the light emission area (7") being formed with the light emission opening (8"); and wherein the light emission opening (8") is smaller than a maximum radial dimension of the lighting unit (3"), in a manner preventing the lighting unit (3") from being introduced into the internal space (12") and attached to the rear wall (13") through the light emission opening (8").

2. Lighting device according to claim 1, wherein the lamp housing has at least one access opening (61") in a section thereof between the light output side and the curved, dome-shaped rear wall and wherein a wire (65) for the electrical supply of the lighting unit is routed through the access opening (61; 61") and connects the lighting unit to a control device (80) located outside of the lamp housing.

3. Lighting device according to claim 1, wherein the adjustment of the beam direction (A) involves an adjustment of an emission angle (B) of the lighting unit in relation to an axis (A2") of the lamp housing and/or an adjustment by rotating the beam direction (A) around the axis of the lamp housing.

4. Lighting device according to claim 1, wherein the lighting device is a built-in lamp, and/or the lamp housing is adapted to be mounted in a recess (29") or cavity, wherein the recess or cavity (129; 129') is in a ceiling or a ceiling component, in a wall or a wall component, in a floor or a floor component, or in an outer housing.

5. Lighting device according to claim 1, wherein the lamp housing is designed to be substantially flush with a surface surrounding the mounted lamp housing in an assembled state.

6. Lighting device according to claim 1, wherein the lamp housing (2") has one or more fastening devices (40") for fastening the lamp housing (2") in a recess (29") of a plate element (25").

7. Lighting device according to claim 1, wherein the lighting unit extends in a longitudinal section thereof from the light output side to the rear side of the lighting unit, initially widening, then narrowing, the lighting unit (3") having a middle area (M) of essentially constant maximum radial dimension thereof, positioned axially between the light output side (17") and the rear side (19") of the lighting unit (3").

8. Lighting device according to claim 1, wherein the device, which is used to attach the lighting unit to the rear wall by means of a magnetic force at a selectable point of the lamp housing, is a magnet (23").

9. Lighting device according to claim 1, wherein the rear wall of the lamp housing is made of a ferromagnetic material.

10. Lighting device according to claim 9, wherein the rear wall of the lamp housing is made of steel.

11. Lighting device according to claim 1, wherein the beam direction (A) can be continuously adjusted or wherein the beam direction (A) can be adjusted in predefined stages.

12. Lighting device according to claim 11, wherein a beam angle (β) of the beam direction (A) in relation to an axis (A2") of the lamp housing can be adjusted continuously or in predefined stages and/or the beam direction (A) can be continuously rotated about the axis of the lamp housing.

13. Lighting device according to claim 1, wherein on the rear side of the lighting unit, a spring-loaded element (159)

is positioned, facing towards an internal side of the curved, dome-shaped rear wall of the lamp housing.

14. Lighting device according to claim 13, wherein the spring-loaded element is a ball (159).

15. A lighting device (1") with a lamp housing (2") and a lighting unit (3"), wherein the lamp housing (2") on a light output side (5") thereof has a light emission area (7") and the lamp housing (2") on a side (11") thereof opposite to the light output side (5") has a curved, dome-shaped rear wall (13");

wherein the lamp housing (2") further includes a cylindrical wall section (52", 56") between the curved, dome-shaped rear wall (13") and the light output side (5") of the lamp housing (2");

wherein the lighting unit (3") is set up to emit light on a light output side (17") thereof in order to transmit the light through the light emission area (7") of the lamp housing (2");

wherein the lighting unit (3") comprises a heat sink (18");

wherein the lighting unit (3") on a rear side (19") facing away from the light output side (17") thereof has at least one device (23"), which is used to attach the lighting unit (3") to a selectable point on the rear wall (13") of the lamp housing (2") by means of a magnetic force, as a result of which a beam direction (A) of the lighting unit (3") can be adjusted in relation to the lamp housing (2");

wherein the beam direction (A) of the lighting unit can be adjusted using a tool (97, 97') and the tool (97, 97') has a continuous opening (98, 98') which allows light emitted (99, 99') by the lighting unit to exit through the continuous opening (98, 98') when adjusting the beam direction (A0 using the tool (97, 97'), which makes it possible for the operator to see the current beam direction (A) of the lighting unit;

wherein the lamp housing (2") has a cover element (26"), which is formed with the light emission area (7") and is positioned to cover an opening (59") in the lamp housing (2") on the light output side (5") which enables the lighting unit (3") to be inserted into the lamp housing (2") through the opening (59");

wherein the cover element (26") for covering the opening (59") is magnetically attachable; and wherein the cover element (26") is configured to be fitted into the opening (59") and has a central access opening that serves as a light emission opening (8"), the light emission area (7") being formed with the light emission opening (8").

16. The lighting device according to claim 15, wherein the tool (97, 97') is rod-shaped or tubular.

17. The lighting device according to claim 15, wherein the light emission area of the lamp housing with the lighting device (1") in an installed state has the light emission opening accessible from a visible side(S) and wherein the tool (97, 97') is designed to engage with a coupling device (37") on the light output side (17") of the lighting unit in order to adjust the beam direction (A).

18. The lighting device according to claim 17, wherein the tool is designed to engage within the coupling device or wherein the tool is designed to engage with the coupling device through the light emission opening of the lamp housing.

19. A lighting device (1") with a lamp housing (2") and a lighting unit (3"), wherein the lamp housing (2") on a light output side (5") thereof has a light emission area (7") and the lamp housing (2") on a side (11") thereof opposite to the light output side (5") has a curved, dome-shaped rear wall (13");

wherein the lamp housing (2") further includes a cylindrical wall section (52", 56") between the curved, dome-shaped rear wall (13") and the light output side (5") of the lamp housing (2");

wherein the lighting unit (3") is set up to emit light on a light output side (17") thereof in order to transmit the light through the light emission area (7") of the lamp housing (2");

wherein the lighting unit (3") comprises a heat sink (18");

wherein the lighting unit (3") on a rear side (19") facing away form the light output side (17") thereof has at least one device (23") which is used to attach the lighting unit (3") to a selectable point on the rear wall (13") of the lamp housing (2") by means of a magnetic force, as a result of which a beam direction (A) of the lighting unit (3") can be adjusted in relation to the lamp housing (2");

wherein on the rear side of the lighting unit, a spring-loaded element (159) is positioned, facing towards an internal side of the curved, dome-shaped rear wall of the lamp housing;

wherein the beam direction (A) of the lighting unit (3") is adjusted by moving the rear side (19") of the lighting unit (3") along the curved, dome-shaped rear wall (13") of the lamp housing (2");

wherein the lamp housing (2") has a cover element (26"), which is formed with the light emission area (7") and is positioned to cover an opening (59") in the lamp housing (2") on the light output side (5") which enables the lighting unit (3") to be inserted into the lamp housing through the opening (59");

wherein the cover element (26") for covering the opening (59") is magnetically attachable; and wherein the cover element (26") is configured to be fitted into the opening (59") and has a central access opening that serves as a light emission opening (8"), the light emission area (7") being formed with the light emission opening (8").

20. The lighting device according to claim 19, wherein the spring-loaded element is a ball (159).

* * * * *